United States Patent
Zhou et al.

(10) Patent No.: US 11,044,729 B2
(45) Date of Patent: Jun. 22, 2021

(54) FUNCTION SCHEDULING METHOD, DEVICE, AND SYSTEM

(71) Applicant: Huawei Technologies Co., Ltd., Shenzhen (CN)

(72) Inventors: Runze Zhou, Shanghai (CN); Shengxian Nie, Shanghai (CN); Zhongping Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 221 days.

(21) Appl. No.: 16/402,645

(22) Filed: May 3, 2019

(65) Prior Publication Data
US 2019/0261351 A1 Aug. 22, 2019

Related U.S. Application Data

(63) Continuation of application No. PCT/CN2016/104682, filed on Nov. 4, 2016.

(51) Int. Cl.
*H04W 72/04* (2009.01)
*H04W 28/02* (2009.01)
*H04W 72/10* (2009.01)
*H04W 72/12* (2009.01)
*H04W 4/021* (2018.01)
(Continued)

(52) U.S. Cl.
CPC .......... *H04W 72/048* (2013.01); *H04L 67/10* (2013.01); *H04W 4/02* (2013.01); *H04W 4/021* (2013.01);
(Continued)

(58) Field of Classification Search
CPC .......... H04W 72/048; H04W 28/0215; H04W 28/0226; H04W 72/0486; H04W 72/10;
(Continued)

(56) References Cited

U.S. PATENT DOCUMENTS 9,088,922 B2 7/2015 Lu et al.
9,119,028 B2 8/2015 Edge et al.
(Continued)

FOREIGN PATENT DOCUMENTS

CN 101141306 A 3/2008
CN 102271320 A 12/2011
(Continued)

OTHER PUBLICATIONS

Qualcomm Incorporated et al.,"Clarifications on UE/MME behaviour for CN Overload Control for CP Optimization", SA WG2 Meeting #117, S2-166201, Oct. 17-21, 2016, 5 pages, Kaohsiu,Taiwan
(Continued)

*Primary Examiner* — Jae Y Lee
*Assistant Examiner* — Aixa A Guadalupe Cruz
(74) *Attorney, Agent, or Firm* — Slater Matsil, LLP

(57) ABSTRACT

Embodiments of the present disclosure disclose a function scheduling method, a device, and a system. The method includes: sending, by a control plane network element, a first request to a user plane network element, where the first request is used to request the user plane network element to perform a first function, and the first function is a function supported by both the control plane network element and the user plane network element; and disabling, by the control plane network element, the first function. In the solutions of the embodiments of the present disclosure, a function supported by both the user plane network element and the control plane network element can be flexibly processed.

20 Claims, 12 Drawing Sheets

(51) Int. Cl.
  H04L 29/08    (2006.01)
  *H04W 28/08*  (2009.01)
  *H04W 92/04*  (2009.01)
  *H04W 4/02*   (2018.01)
  *H04W 84/04*  (2009.01)
  *H04L 12/803* (2013.01)

(52) U.S. Cl.
  CPC ... *H04W 28/0215* (2013.01); *H04W 28/0226* (2013.01); *H04W 28/08* (2013.01); *H04W 72/0486* (2013.01); *H04W 72/10* (2013.01); *H04W 72/1242* (2013.01); *H04W 92/04* (2013.01); *H04L 47/125* (2013.01); *H04W 28/0231* (2013.01); *H04W 84/042* (2013.01)

(58) Field of Classification Search
  CPC . H04W 72/1242; H04W 80/02; H04W 36/08; H04W 76/19; H04W 72/042; H04W 28/0231; H04W 28/0257; H04W 28/12; H04W 72/1252; H04W 8/08; H04L 41/0893
  See application file for complete search history.

(56) References Cited

U.S. PATENT DOCUMENTS

| | | | | |
|---|---|---|---|---|
| 10,362,632 | B2* | 7/2019 | Bedekar | H04W 24/02 |
| 2016/0295476 | A1 | 10/2016 | Bi et al. | |
| 2017/0012956 | A1* | 1/2017 | Lee | H04W 12/03 |

FOREIGN PATENT DOCUMENTS

| | | |
|---|---|---|
| CN | 102378125 A | 3/2012 |
| CN | 103945535 A | 7/2014 |

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access (Release 14), 3GPP TS 23.401 V14.1.0 (Sep. 2016), 358 pages.

\* cited by examiner

FUNCTION SCHEDULING METHOD, DEVICE, AND SYSTEM

CROSS-REFERENCE TO RELATED APPLICATIONS

This application is a continuation of International Application No. PCT/CN2016/104682, filed on Nov. 4, 2016, the disclosure of which is hereby incorporated by reference in its entirety.

TECHNICAL FIELD

The present disclosure relates to the communications field, and in particular, to a function scheduling method, a device, and a system.

BACKGROUND

Control and user plane separation (CUPS) is a development trend of a core network architecture, and different functional entities separately perform a user plane (UP) function and a control plane (CP) function. As network entities are classified into a user plane network element and a control plane network element, some main functions also need to be classified based on a supporter thereof. In statuses of supporting existing network functions by the control plane network element and the user plane network element shown in Table 1, some functions are supported by only the control plane network element or the user plane network element, but some functions can be supported by both the control plane network element and the user plane network element. For the function that can be supported by both the control plane network element and the user plane network element, which of the control plane network element and the user plane network element is to perform the function needs to be determined in a specific network.

TABLE 1

| Supported by only the control plane network element | Supported by only the user plane network element | Supported by both the user plane network element and the control plane network element |
| --- | --- | --- |
| Signaling processing | Data forwarding | Data buffering |
| Call detail record generation | Data statistics collection | User plane tunnel address allocation |
| User IP address allocation | Packet marking | Packet redirection |

In the prior art, it is determined, through configuration of an operator device, whether the control plane network element or the user plane network element is to perform the shared function that can be supported by both the control plane network element and the user plane network element. As shown in FIG. 1A, a configuration manner of the operator device is: setting, on a hardware device, that some shared functions are performed on the control plane network element by default, other shared functions are performed on the user plane network element by default, and this remains unchanged subsequently.

However, in the prior art, presetting, in the configuration manner of the operator device, that some shared functions can be performed only on the control plane network element or the user plane network element is equivalent to setting the shared functions to be fixedly performed by the control plane network element or the user plane network element. The processing manner is monotonous and has low flexibility.

SUMMARY

Embodiments of the present disclosure provide a function scheduling method, a device, and a system, to flexibly process a function supported by both a user plane network element and a control plane network element.

According to one aspect, an embodiment of the present disclosure provides a function scheduling method. The method includes: sending, by a control plane network element, a first request to a user plane network element, where the first request is used to request the user plane network element to perform a first function, and the first function is a function supported by both the control plane network element and the user plane network element; enabling, by the user plane network element, the first function after receiving the first request from the control plane network element; and disabling, by the control plane network element, the first function. In this embodiment of the present disclosure, because the user plane network element supports the first function, the control plane network element transfers the first function to the user plane network element for performing, so that network resources can be dynamically adjusted, and a function supported by both the control plane network element and the user plane network element can be more flexibly performed.

In a possible design, before the control plane network element sends the first request to the user plane network element, the control plane network element may further obtain current load of the control plane network element or location information, where the location information includes location information of the user plane network element and location information of a terminal; and then the control plane network element may determine, based on the current load of the control plane network element or the location information, that the first request needs to be sent to the user plane network element.

In a possible implementation, after obtaining the location information of the user plane network element and the location information of the terminal, the control plane network element may obtain a first distance and a second distance. The first distance is a distance between the control plane network element and the terminal, and the second distance is a distance between the user plane network element and the terminal. That the control plane network element determines, based on the location information, that the first request needs to be sent to the user plane network element may be implemented in the following manner. The control plane network element compares the first distance with the second distance based on the location information; and if the first distance is greater than the second distance, the control plane network element determines that the first request needs to be sent to the user plane network element.

In the foregoing implementation, the control plane network element may obtain the location information in the following manners. The control plane network element may receive the location information of the terminal from the terminal; and the control plane network element may receive the location information of the user plane network element from the user plane network element, or the control plane network element may locally obtain the location information of the user plane network element.

In another possible implementation, that the control plane network element determines, based on the current load of the control plane network element, that the first request needs to be sent to the user plane network element may be implemented in the following manner. If the current load of the control plane network element reaches or exceeds a first threshold, the control plane network element determines that the first request needs to be sent to the user plane network element. In this manner, when the load of the control plane network element is very high, the user plane network element may be requested to enable the first function.

In a possible design, after the control plane network element determines, based on the current load of the control plane network element or the location information, that the first request needs to be sent to the user plane network element, and before the control plane network element sends the first request to the user plane network element, the control plane network element may further determine that the user plane network element supports the first function. In this embodiment of the present disclosure, the control plane network element can send the first request to the user plane network element when determining that the user plane network element supports the first function, to ensure that the first function can be successfully transferred to the user plane network element for performing.

In a possible implementation, before the control plane network element determines that the user plane network element supports the first function, the control plane network element may further receive a first function list from the user plane network element, where the first function list includes all functions supported by the user plane network element; or the control plane network element may locally query and obtain a second function list, where the second function list includes all functions supported by the user plane network element or all functions supported by both the control plane network element and the user plane network element. In this implementation, if the first function list or the second function list includes the first function, the control plane network element may determine that the user plane network element supports the first function.

In a possible design, after determining that the user plane network element supports the first function, the control plane network element may further receive dynamic load status information of the user plane network element from the user plane network element, and determine an available resource of the user plane network element based on the dynamic load status information of the user plane network element; the control plane network element may determine a resource occupied by the first function; and if the available resource of the user plane network element is larger than the resource occupied by the first function, the control plane network element may determine that the user plane network element currently has a capability of performing the first function.

In a possible implementation, before the control plane network element receives the dynamic load status information of the user plane network element from the user plane network element, the control plane network element may further send a first interval instruction to the user plane network element, where the first interval instruction is used to instruct the user plane network element to report the dynamic load status information of the user plane network element to the control plane network element at a preset interval; or the control plane network element may further send a load request to the user plane network element, where the load request is used to instruct the user plane network element to report the dynamic load status information of the user plane network element.

In a possible design, after the control plane network element determines that the user plane network element currently has the capability of performing the first function, the control plane network element may further obtain first identification information corresponding to the first function, where the first identification information includes a user identifier, a tunnel identifier, or a service identifier, and the first request carries the first identification information; then the control plane network element may determine a priority of the first identification information based on a correspondence between identification information and a priority level; and the control plane network element may further determine, based on the priority of the first identifier information and a preset priority execution mode, that the first function is to be performed by the user plane network element. In this embodiment of the present disclosure, the control plane network element determines the priority of the first identification information based on the first identification information, and finds an execution mode of the first function based on the preset priority execution mode, to determine that the first function is to be performed by the user plane network element. A specific scenario in practical application is considered, so that this embodiment of the present disclosure is more complete in actual operation.

The first function in this embodiment of the present disclosure may include at least one of the following: a data buffering function, a user plane tunnel address allocation function, or a packet redirection function.

In a possible design, the first function is a function for address allocation. After enabling the first function, the user plane network element may further update locally stored information about an allocable address based on the first function. Alternatively, the user plane network element may further send an address allocation instruction to an operator device, and receive an allocable address sent by the operator device.

In a possible design, the first function is a function for data buffering, and before receiving the first request from the control plane network element, the user plane network element may further receive a second interval instruction from the control plane network element or the operator device, where the second interval instruction is used to instruct the user plane network element to report the dynamic load status information of the user plane network element to the control plane network element at a preset interval; or the user plane network element may further receive a load request from the control plane network element, where the load request is used to instruct the user plane network element to report the dynamic load status information of the user plane network element. Correspondingly, after receiving the second interval instruction or the load request, the user plane network element may send the dynamic load status information of the user plane network element to the control plane network element.

In a possible design, the user plane network element may determine, based on the dynamic load status information of the user plane network element and the first function, to enable the first function.

In a possible implementation, the user plane network element may determine a size of a resource occupied by the first function; and if it is determined, based on the size of the resource occupied by the first function and the dynamic load status information of the user plane network element, that load of the user plane network element does not exceed a second threshold after the first function is enabled, the user plane network element may determine to enable the first function. For example, the user plane network element may obtain a size of a currently used resource of the user plane network element based on the dynamic load status information of the user plane network element; then the user plane network element adds the size of the used resource and the size of the resource occupied by the first function, to obtain a first value; and if the first value is less than a preset size of a used resource, the user plane network element may determine that the load of the user plane network element does not exceed the second threshold after the first function is enabled. In another example, the user plane network element may obtain a size of a currently remaining resource of the user plane network element based on the dynamic load status information of the user plane network element; then the user plane network element subtracts the size of the resource occupied by the first function from the size of the remaining resource, to obtain a second value; and if the second value is greater than a preset size of a remaining resource, the user plane network element may determine that the load of the user plane network element does not exceed the second threshold after the first function is enabled.

According to another aspect, an embodiment of the present disclosure provides another function scheduling method. The method includes: sending, by a user plane network element, a second request to a control plane network element, where the second request is used to request the control plane network element to perform a second function, and the second function is a function supported by both the control plane network element and the user plane network element; enabling, by the control plane network element, the second function after receiving the second request from the user plane network element; and disabling, by the user plane network element, the second function.

In a possible design, before sending the second request to the control plane network element, the user plane network element may further determine, based on current load of the user plane network element, that the second request needs to be sent to the control plane network element. For example, the user plane network element may obtain the current load of the user plane network element, and if the current load exceeds a third threshold, the user plane network element determines that the second request needs to be sent to the control plane network element.

In a possible design, the second request may carry dynamic load status information of the user plane network element, and after receiving the second request from the user plane network element, the control plane network element may further determine, based on the second request, all functions currently performed by the user plane network element; and the control plane network element determines the second function from all the functions currently performed by the user plane network element. Alternatively, the second request may carry information about the second function, and the control plane network element may determine the second function based on the second request.

According to still another aspect, an embodiment of the present disclosure provides a control plane network element, and the control plane network element has a function of implementing behaviors of the control plane network element in the foregoing method designs. The function may be implemented by hardware, or may be implemented by hardware by executing corresponding software. The hardware or the software includes one or more modules corresponding to the foregoing function.

In a possible design, the control plane network element includes a processor, and the processor is configured to support the control plane network element in performing corresponding functions in the foregoing method. The control plane network element may further include a communications interface, and the communications interface is configured to support communication between the control plane network element and a user plane network element or another network entity. The control plane network element may further include a memory, and the memory is configured to be coupled to the processor and store necessary program instructions and data of the control plane network element.

According to still another aspect, an embodiment of the present disclosure provides a user plane network element, and the user plane network element has a function of implementing behaviors of the user plane network element in the foregoing method designs. The function may be implemented by hardware, or may be implemented by hardware by executing corresponding software. The hardware or the software includes one or more modules corresponding to the foregoing function.

In a possible design, the user plane network element includes a processor, and the processor is configured to support the user plane network element in performing corresponding functions in the foregoing method. The user plane network element may further include a communications interface, and the communications interface is configured to support communication between the user plane network element and a control plane network element or another network entity. The user plane network element may further include a memory, and the memory is configured to be coupled to the processor and store necessary program instructions and data of the user plane network element.

According to yet another aspect, an embodiment of the present disclosure provides a computer storage medium, configured to store a computer software instruction used for the foregoing control plane network element, where the computer software instruction includes a program designed to perform the foregoing aspects.

According to yet another aspect, an embodiment of the present disclosure provides a computer storage medium, configured to store a computer software instruction used for the foregoing user plane network element, where the computer software instruction includes a program designed to perform the foregoing aspects.

According to yet another aspect, an embodiment of the present disclosure provides a communications system, and the system includes the control plane network element and the user plane network element described in the foregoing aspects.

Compared with the prior art, in the technical solutions provided in the embodiments of the present disclosure, the control plane network element sends the first request to the user plane network element, where the first request is used to request the user plane network element to perform the first function, and the first function is a function supported by both the control plane network element and the user plane network element; and then the control plane network element disables the first function. In the embodiments of the present disclosure, because the user plane network element supports the first function, the control plane network element can transfer the first function to the user plane network element for performing, so that network resources can be dynamically adjusted, and a function supported by both the control plane network element and the user plane network element can be more flexibly performed.

DETAILED DESCRIPTION OF ILLUSTRATIVE EMBODIMENTS

To make the objectives, technical solutions, and advantages of the embodiments of the present disclosure clearer, the following describes the technical solutions of the embodiments of the present disclosure with reference to the accompanying drawings in the embodiments of the present disclosure.

Network architectures and service scenarios described in the embodiments of the present disclosure are intended to describe the technical solutions in the embodiments of the present disclosure more clearly, but are not intended to limit the technical solutions provided in the embodiments of the present disclosure. A person of ordinary skill in the art may learn that, with evolution of the network architecture and emergence of a new service scenario, the technical solutions provided in the embodiments of the present disclosure are also applicable to a similar technical problem.

Figure 1A:
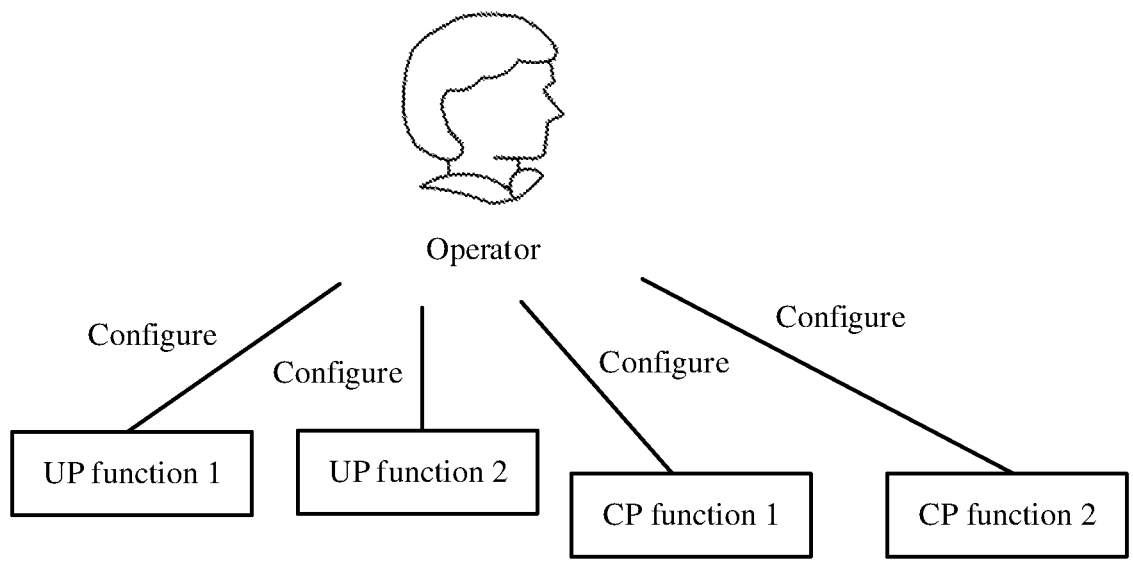
FIG. 1A is a schematic diagram of a possible existing solution.
Figure 1B:
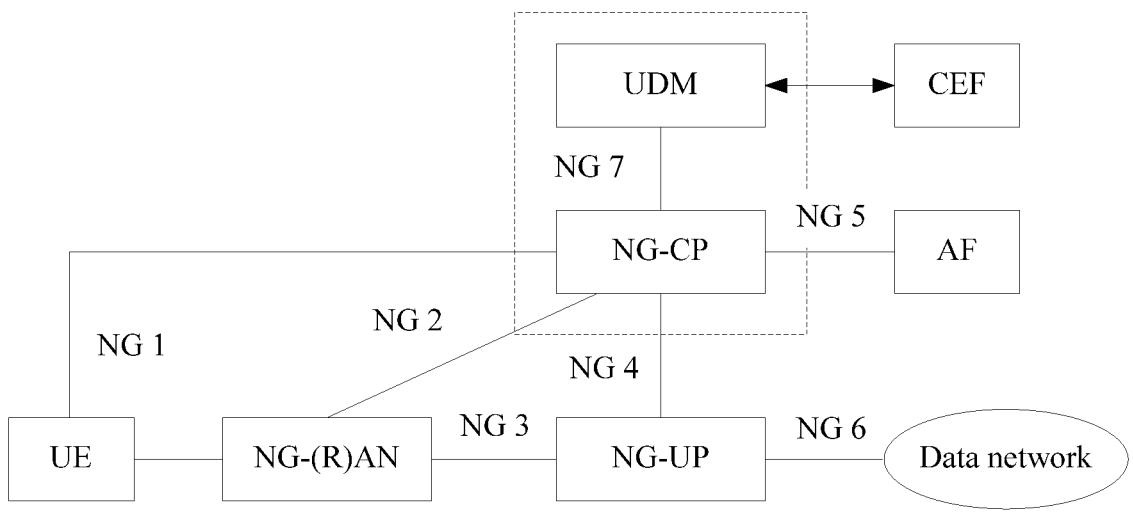
FIG. 1B is a schematic diagram of a possible network architecture according to an embodiment of the present disclosure.

FIG. 1B is a schematic diagram of a possible network architecture according to an embodiment of the present disclosure. The network architecture is a network architecture in which a control plane is separated from a user plane. In FIG. 1B, a terminal accesses a core network by using an access network. The terminal may be user equipment (UE), the access network may be a next generation radio access network (NG-RAN), and the core network may include a control plane network element, a user plane network element, and the like. The control plane network element may be a next generation control plane (NG-CP) network element, and the user plane network element may be a next generation user plane (NG-UP) network element. The NG-CP network element is connected to an application function (AF) entity. The AF entity is a unit providing an application service, and mainly performs dynamic policy/charging control on an IP-CAN user plane behavior. The NG-CP network element is further connected to a unified data management (UDM) platform, to perform a capability exposure function (CEF), thereby implementing load balance of destination-based configuration and load balance of data packet-based configuration. The NG-UP network element is connected to a data network, to process data.

In the prior art, it is determined, through configuration of an operator, whether a user plane or a control plane is to perform a function supported by both the user plane and the control plane. However, in this manner, the function supported by both the user plane network element and the control plane network element can be fixedly performed only on the control plane or the user plane. The processing manner is monotonous and has low flexibility.

Figure 2:
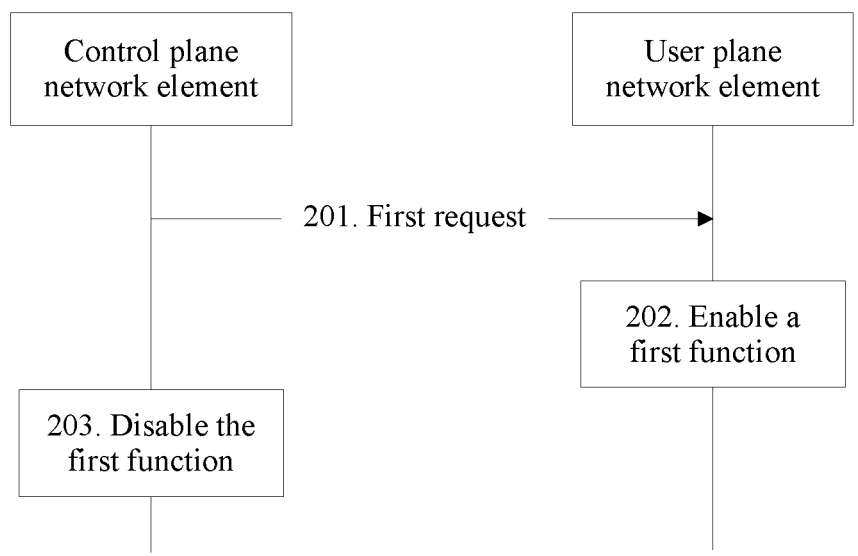
FIG. 2 is a schematic communication diagram of a possible function scheduling method according to an embodiment of the present disclosure.

In view of this, the embodiments of the present disclosure provide a function scheduling method, and a control plane network element, a user plane network element, and a system that are based on the method. The method includes: sending, by a control plane network element, a first request to a user plane network element, where the first request is used to request the user plane network element to perform a first function, and the first function is a function supported by both the control plane network element and the user plane network element; enabling, by the user plane network element, the first function; and disabling, by the control plane network element, the first function. In the solution of the embodiments of the present disclosure, the control plane network element may transfer the first function, namely, the function supported by both the control plane network element and the user plane network element, to the user plane network element for performing, so that network resources can be dynamically adjusted, and the function supported by both the control plane network element and the user plane network element can be more flexibly processed. For example, the function scheduling method may be shown in FIG. 2.

201. A control plane network element sends a first request to a user plane network element.

Specifically, when the control plane network element performs a plurality of functions, the control plane network element may transfer some functions to the user plane network element for performing, to ensure that a system can run normally and stably or more efficiently. Before transferring the function, the control plane network element sends the first request to the user plane network element, where the first request is used to request the user plane network element to perform the first function. It may be understood that the first function is a function supported by both the control plane network element and the user plane network element.

202. The user plane network element enables a first function.

Specifically, because the first request is used to request the user plane network element to perform the first function, the user plane network element learns of, by using the first function, a function that the control plane network element needs to transfer. After the user plane network element receives the first request sent by the control plane network element, the user plane network element enables the first function.

203. The control plane network element disables the first function.

Specifically, the control plane network element may disable the first function after determining that the user plane network element enables the first function.

In this embodiment of the present disclosure, the control plane network element may transfer the first function, namely, the function supported by both the control plane network element and the user plane network element, to the user plane network element for performing, so that network resources can be dynamically adjusted, and the function supported by both the control plane network element and the user plane network element can be more flexibly processed.

In this embodiment of the present disclosure, the first function may include a function for address allocation and/or a function for data buffering. The control plane network element may determine, based on current load of the control plane network element or location information, to send the first request to the user plane network element, to request the user plane network element to perform the first function. It may be understood that the control plane network element currently performs the first function before performing the solution of this embodiment of the present disclosure. In practical application, the first function may also be referred to as a shared function or a common function. This is not limited in this embodiment of the present disclosure.

It can be learned from the foregoing descriptions that there may be the following different cases for a function included in the first function:

Case 1: The first function includes the function for address allocation and the function for data buffering;

Case 2: The first function includes only the function for data buffering; and

Case 3: The first function includes only the function for address allocation.

Figure 3A:
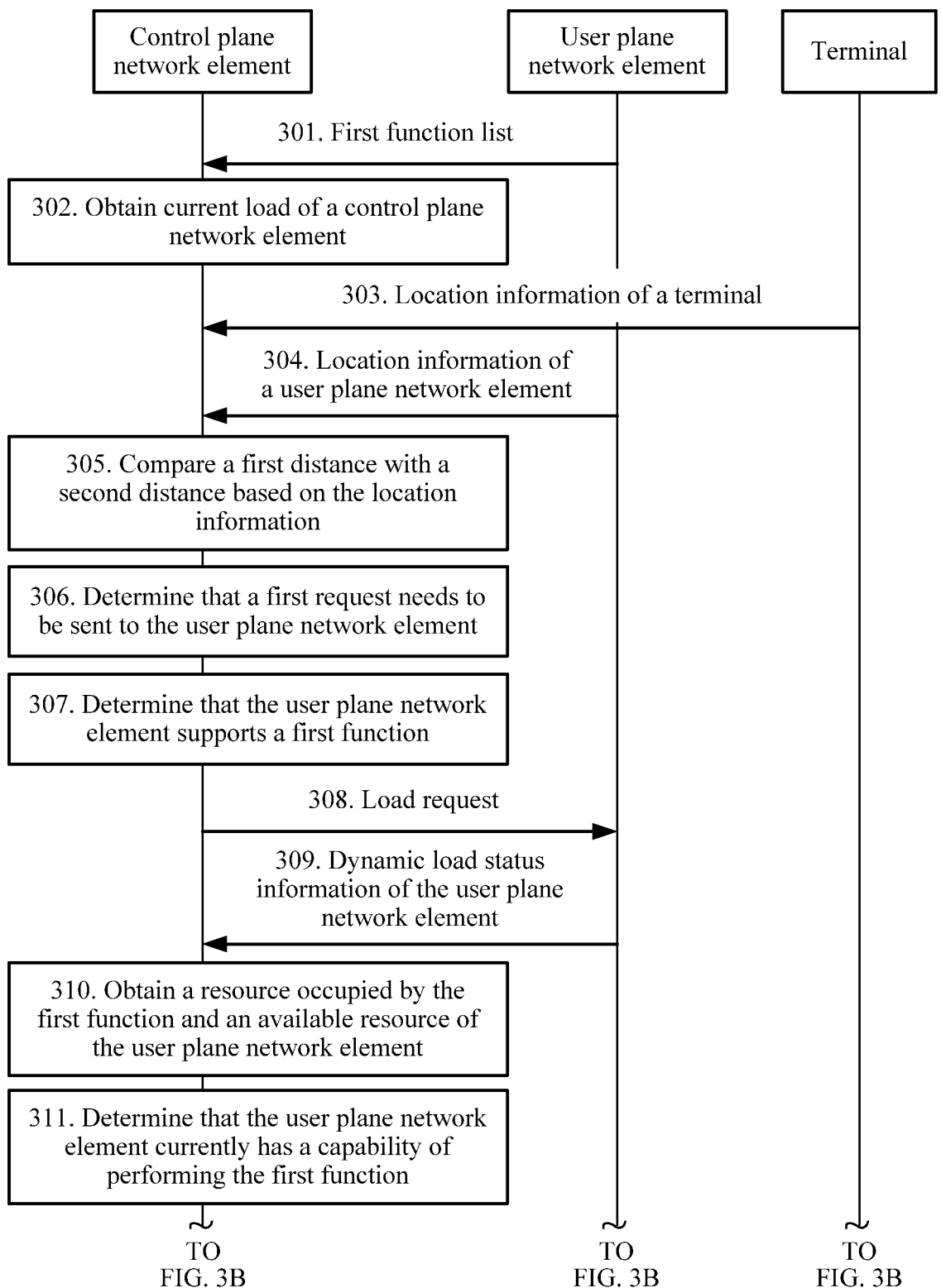
FIG. 3A and FIG. 3B are a schematic communication diagram of another possible function scheduling method according to an embodiment of the present disclosure.
Figure 4A:
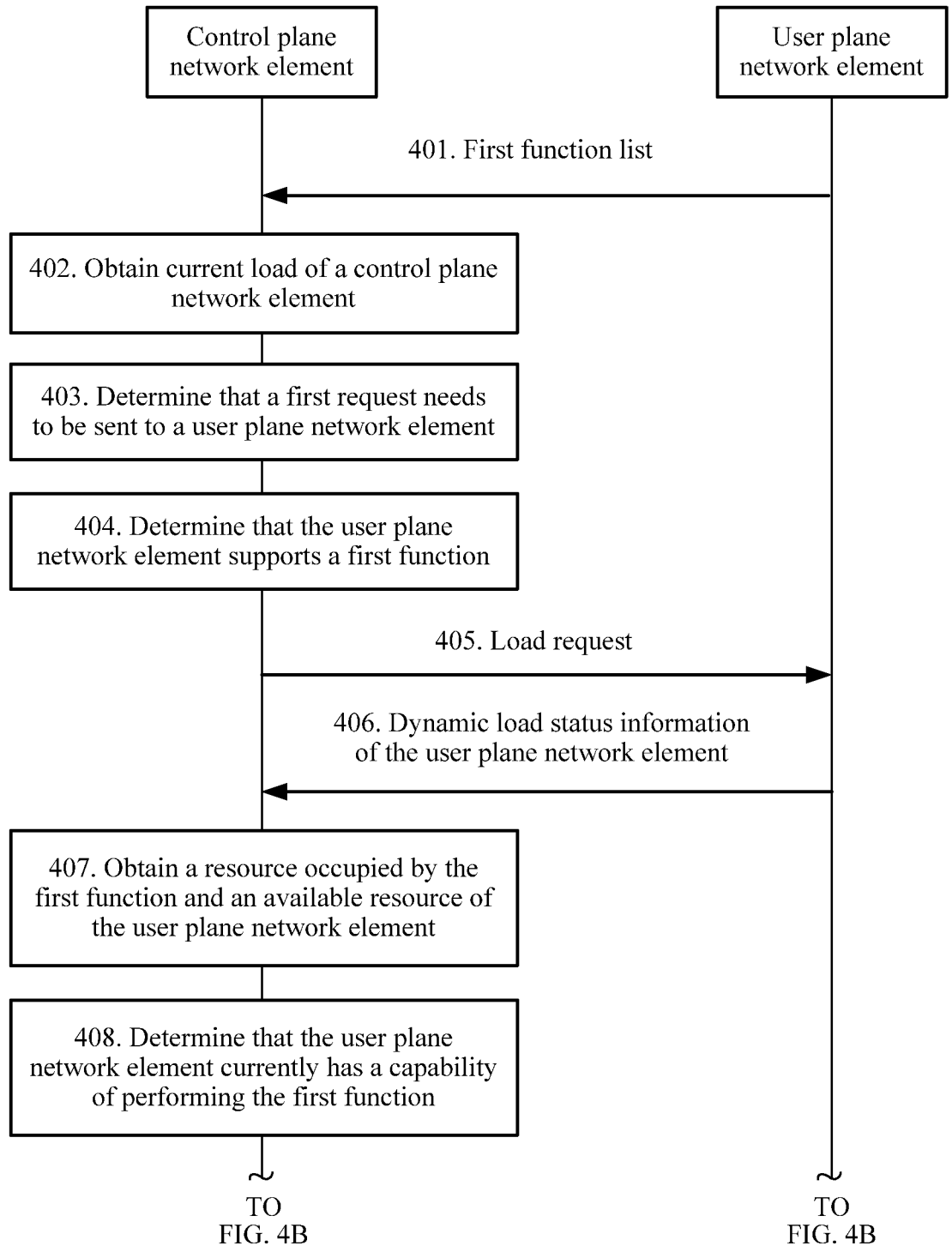
FIG. 4A and FIG. 4B are a schematic communication diagram of still another possible function scheduling method according to an embodiment of the present disclosure.
Figure 4B:
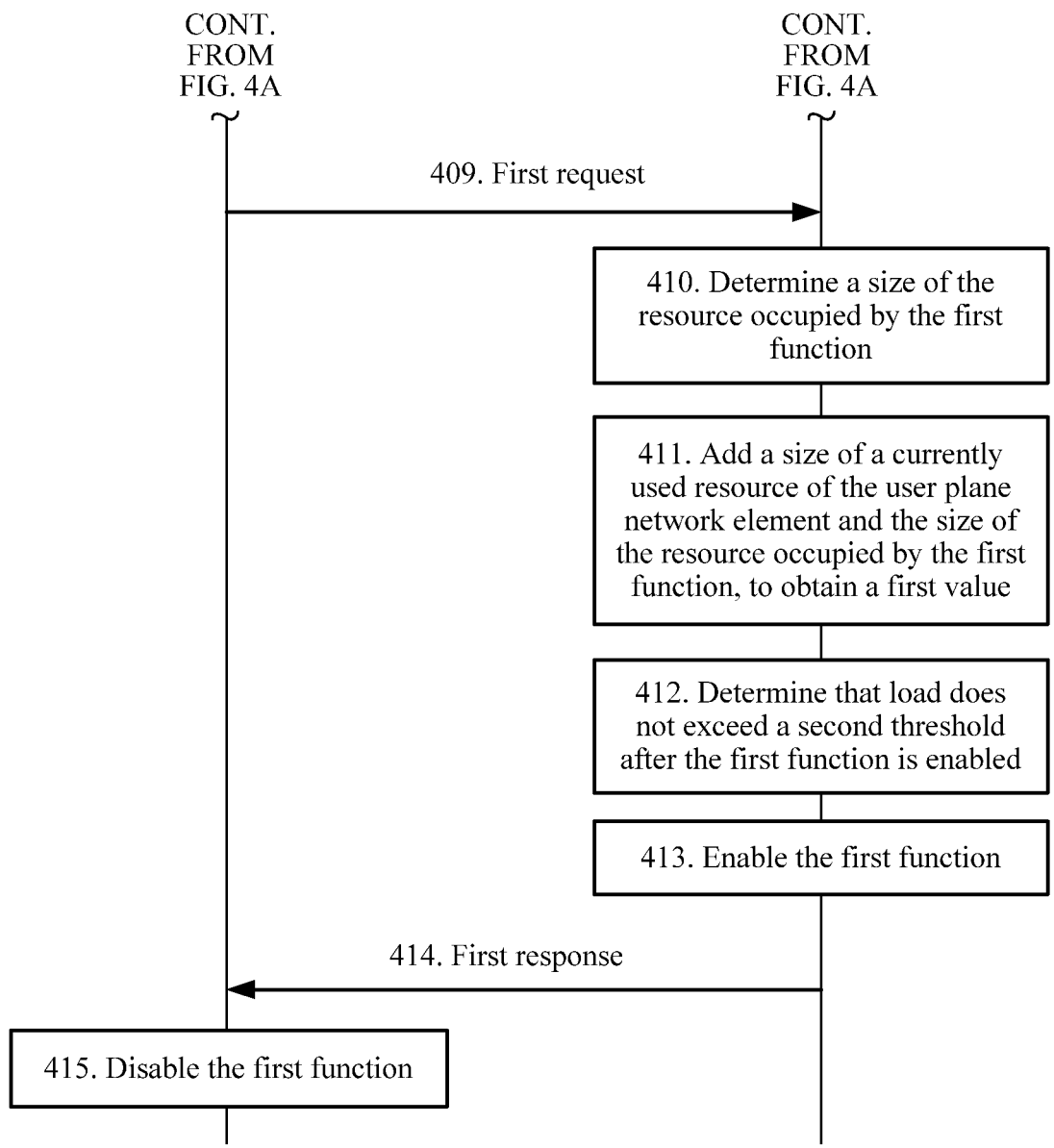
Figure 5A:
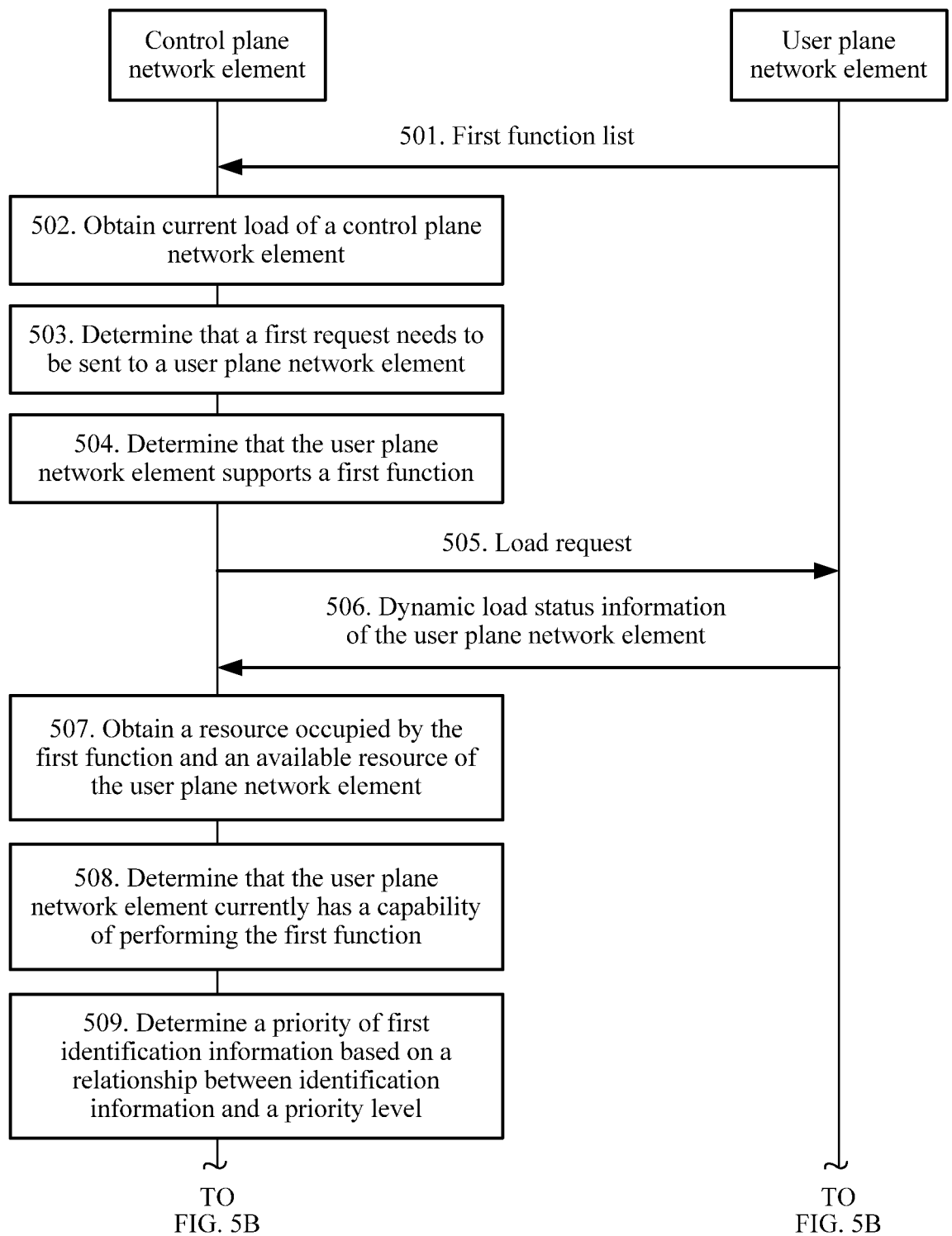
FIG. 5A and FIG. 5B are a schematic communication diagram of yet another possible function scheduling method according to an embodiment of the present disclosure.
Figure 5B:
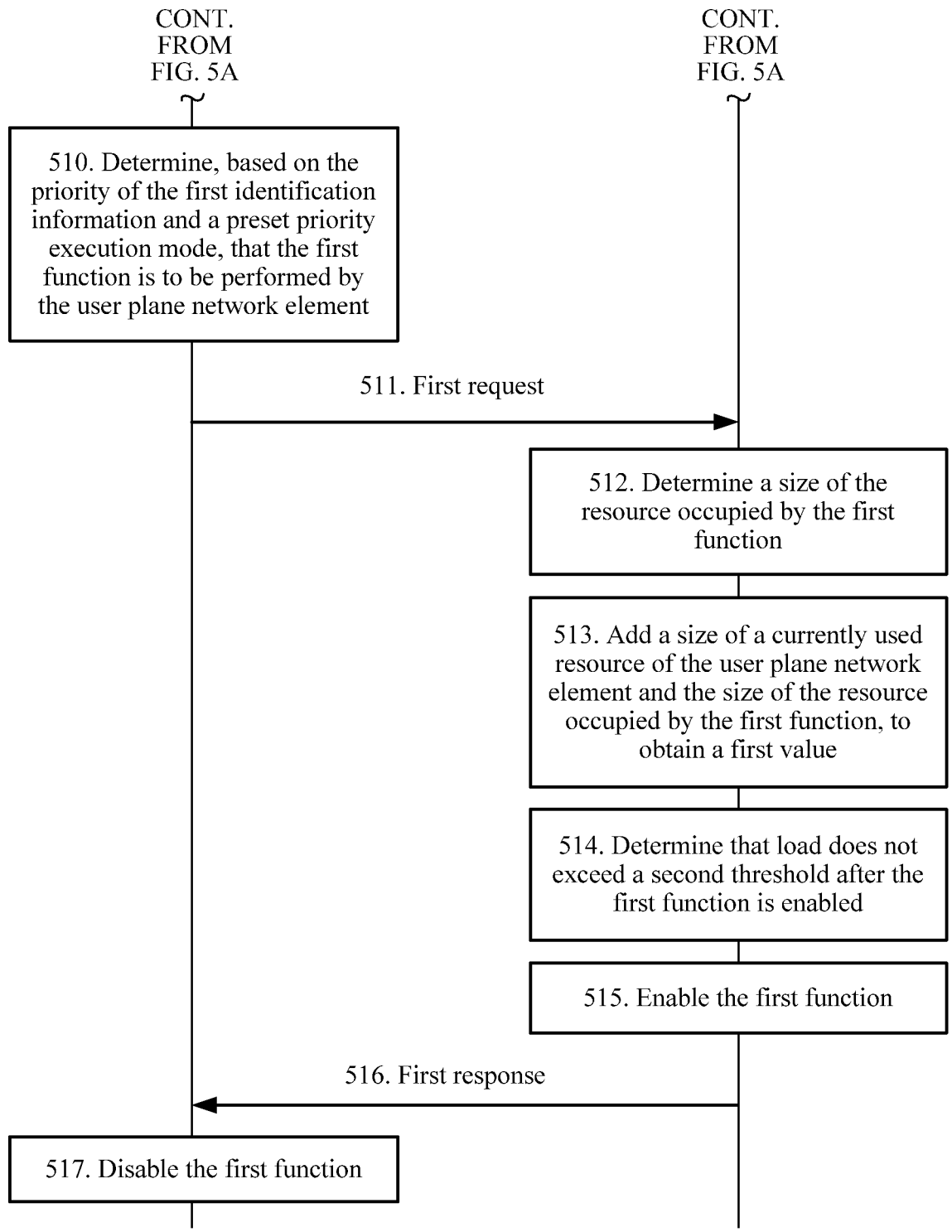
Figure 6:
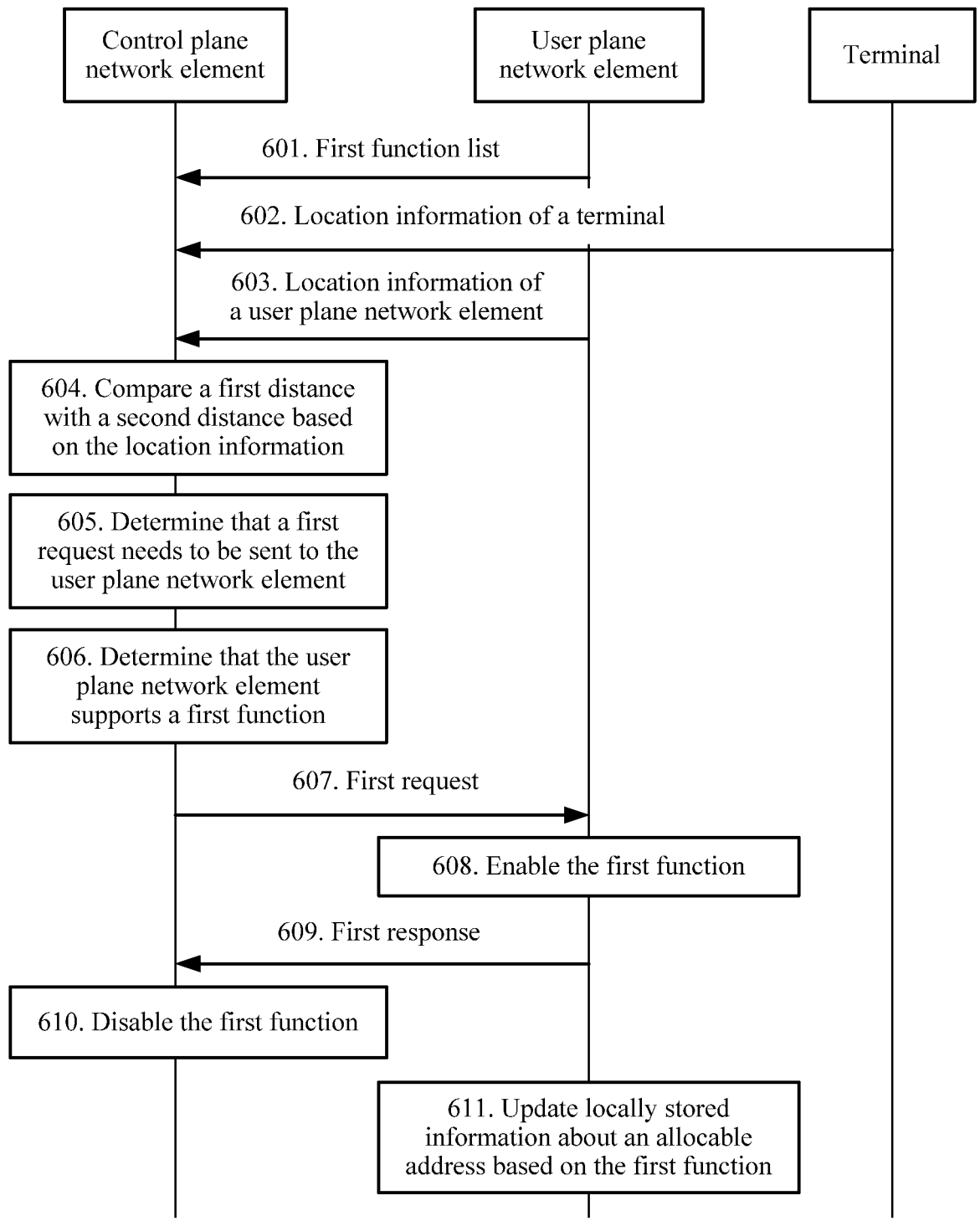
FIG. 6 is a schematic communication diagram of yet another possible function scheduling method according to an embodiment of the present disclosure.

With reference to FIG. 3A to FIG. 6, the following further describes the solutions of the embodiments of the present disclosure. FIG. 3A and FIG. 3B show a function scheduling method in Case 1; FIG. 4A, FIG. 4B, FIG. 5A, and FIG. 5B show a function scheduling method in Case 2; and FIG. 6 shows a function scheduling method in Case 3.

Figure 3B:
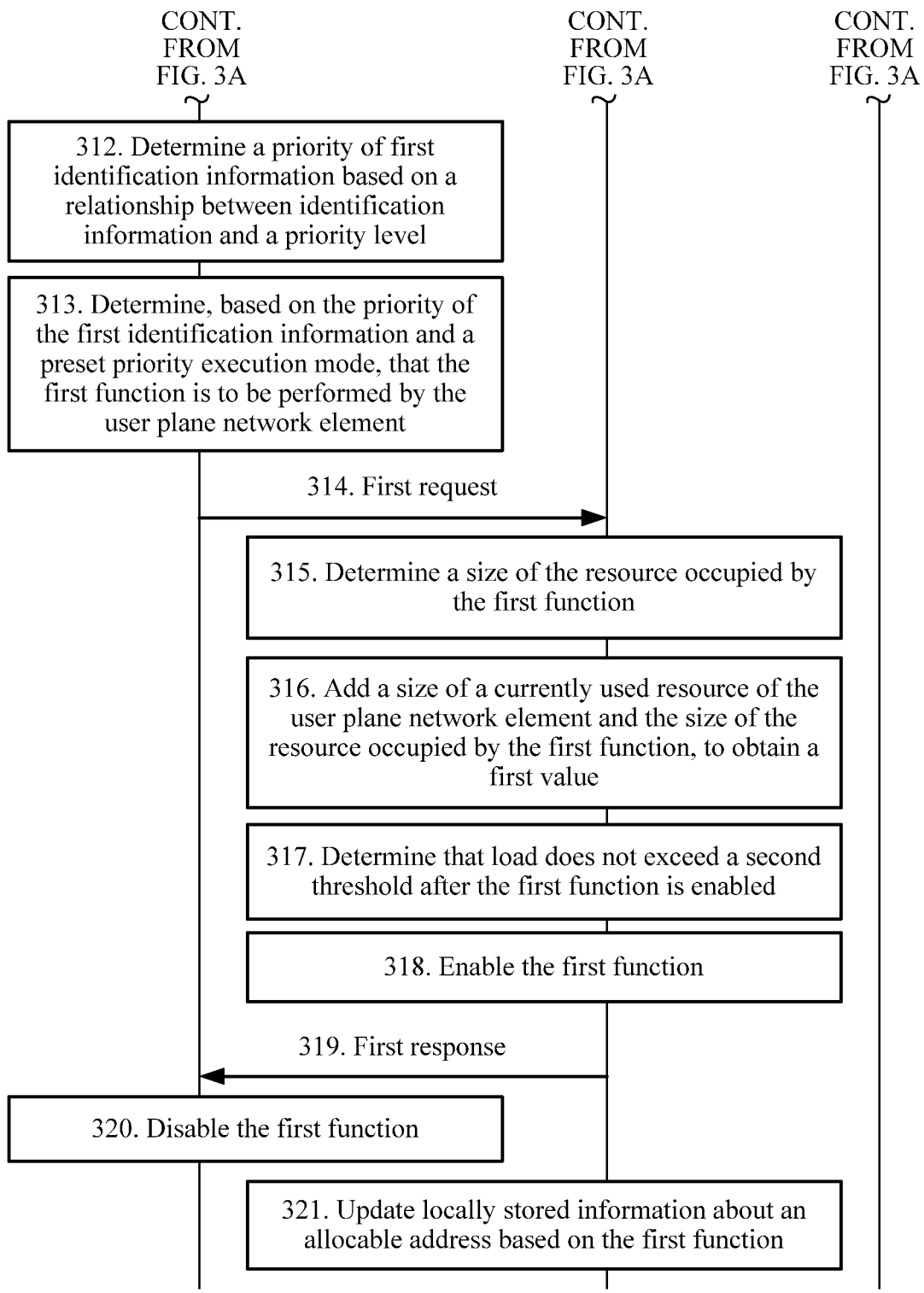

Referring to FIG. 3A and FIG. 3B, an embodiment of a function scheduling method in the embodiments of the present disclosure includes the following steps.

301. A control plane network element receives a first function list from a user plane network element.

When the control plane network element performs a plurality of functions, and needs to transfer a function that is also supported by the user plane network element to the user plane network element, the control plane network element should learn of a function supported by the user plane network element. The control plane network element receives the first function list sent by the user plane network element, and the first function list includes all functions supported by the user plane network element, so that the control plane network element can determine, by using the first function list, the function supported by both the control plane network element and the user plane network element.

In this embodiment of the present disclosure, the control plane network element includes a session management network element, a mobility management network element, a policy function network element, a capability exposure network element, an authentication authorization network element, and the like, and the user plane network element includes an access gateway, a mobility gateway, a local gateway, an anchor gateway, and the like. This is not specifically limited herein.

It should be noted that in practical application, the control plane network element learns of, in a plurality of manners in addition to receiving the first function list sent by the user plane network element, the function supported by the user plane network element. For example, the control plane network element may locally query and obtain a second function list, and the second function list is preconfigured by an operator device and is locally stored. The second function list includes all the functions supported by the user plane network element, so that the control plane network element can learn of, by using the second function list, the functions supported by the user plane network element. In addition, the second function list configured by an operator may directly include all functions supported by both the control plane network element and the user plane network element, so that the control plane network element can directly learn of, by using the second function list, the function supported by both the control plane network element and the user plane network element. Therefore, a manner in which the control plane network element learns of the function supported by the user plane network element is not specifically limited herein.

It may be understood that the user plane network element sends the first function list to the control plane network element in a form of text, a form of a column, or a form of information besides a form of a table. Therefore, a form of the first function list is not specifically limited herein.

302. The control plane network element obtains current load of the control plane network element.

Load is traffic borne on a device, or a quantity of users of the device. High load represents that a quantity of remaining available resources is small, and when the load is very high, a running speed of a system becomes low or even the system is shut down. The function supported by both the control plane network element and the user plane network element includes a function for data buffering, and a relatively large quantity of available system resources are occupied when the function for data buffering is performed. Therefore, to ensure that a system can operate continuously and normally and the system resources can be properly used, the control plane network element obtains the current load of the control plane network element to determine that a first request needs to be sent to the user plane network element, to request to transfer the function for data buffering to the user plane network element for performing.

It should be noted that in practical application, the function for data buffering that is supported by both the user plane network element and the control plane network element includes a packet buffering function, a data buffering function, or the like. This is not specifically limited herein.

303. The control plane network element receives location information of a terminal from the terminal.

After a user plane is separated from a control plane, in a possible case, the control plane network element is deployed at a relatively high location, and the user plane network element is closer to the terminal. Therefore, an information transmission path used when the user plane network element that is closer to the terminal performs a function for address allocation is shorter than an information transmission path used when the control plane network element completes the function, and the terminal can quickly establish a connection to the user plane network element, to complete a corresponding function. Therefore, to ensure that the system completes a corresponding function by using a more optimized path, the control plane network element determines, based on location information, to transfer the function for address allocation to the user plane network element for performing.

The location information includes the location information of the terminal and location information of the user plane network element, and a manner in which the control plane network element obtains the location information of the terminal is that the terminal reports the location information of the terminal to the control plane network element. It should be noted that before the control plane network element receives the location information of the terminal that is reported by the terminal, the control plane network element may send a location instruction to the terminal in real time, to instruct the terminal to report the location information of the terminal, so that the terminal reports the location information of the terminal according to the location instruction. Alternatively, the control plane network element may send an interval instruction to the terminal, to instruct the terminal to report the current location information of the terminal to the control plane network element at a preset interval, so that the terminal sends the location information of the terminal to the control plane network element according to the interval instruction. Therefore, a manner in which the terminal is triggered to send the location information of the terminal to the control plane network element is not specifically limited herein.

It should be noted that in practical application, the function for address allocation that is supported by both the user plane network element and the control plane network element includes a Dynamic Host Configuration Protocol (DHCP) function, a user plane tunnel address allocation function, a packet redirection function, or the like. This is not specifically limited herein.

304. The control plane network element receives location information of the user plane network element from the user plane network element.

The location information includes the location information of the terminal and the location information of the user plane network element. The control plane network element receives the location information of the user plane network element that is sent by the user plane network element, and the location information of the user plane network element includes a location of the user plane network element or a service range of the user plane network element.

It should be noted that in practical application, the control plane network element may obtain the location information of the user plane network element in a manner other than obtaining the location information of the user plane network element that is sent by the user plane network element. For example, the operator device locally prestores the location information of the user plane network element, so that the control plane network element can locally directly obtain the location information of the user plane network element. Therefore, a manner in which the control plane network element obtains the location information of the user plane network element is not specifically limited herein.

In addition, in this embodiment of the present disclosure, the control plane network element obtains the location information of the terminal in step 303, and obtains the location information of the user plane network element in step 304. However, the two processes are performed in no particular order, and step 303 may be first performed, or step 304 may be first performed, or step 303 and step 304 are performed at the same time. This is not specifically limited herein.

305. The control plane network element compares a first distance with a second distance based on the location information.

The control plane network element obtains the location information of the terminal and the location information of the user plane network element, and the control plane network element knows location information of the control plane network element. Therefore, the control plane network element can obtain the first distance and the second distance. The first distance is a distance between the control plane network element and the terminal, and the second distance is a distance between the user plane network element and the terminal. The control plane network element compares the first distance with the second distance, to determine that the first request needs to be sent to the user plane network element, to request to transfer the function for address allocation that is included in a first function in this embodiment to the user plane network element for performing.

It should be noted that in this embodiment of the present disclosure, the control plane network element obtains the first function list in step 301, obtains the current load of the control plane network element in step 302 to determine that the first request needs to be sent to the user plane network element, and obtains the location information in step 303 to step 305 to determine that the first request needs to be sent to the user plane network element. However, the three processes are performed in no particular order. Step 302 may be first performed, then step 303 to step 305 are performed, and step 301 is finally performed; or step 303 to step 305 may be first performed, then step 301 is performed, and step 302 is finally performed; or these steps are performed at the same time. This is not specifically limited herein.

306. The control plane network element determines that a first request needs to be sent to the user plane network element.

After the control plane network element obtains the current load of the control plane network element or the location information, the control plane network element determines, based on the current load of the control plane network element or the location information, that the first request needs to be sent to the user plane network element.

When the first distance is greater than the second distance, in other words, when the distance between the control plane network element and the terminal is greater than the distance between the user plane network element and the terminal, the control plane network element determines that the first request needs to be sent to the user plane network element, where the first request is used to request the user plane network element to perform the function for address allocation.

It should be noted that when the first distance is not greater than the second distance, in other words, when the distance between the control plane network element and the terminal is not greater than the distance between the user plane network element and the terminal, the control plane network element still performs the function for address allocation.

When the current load of the control plane network element reaches or exceeds a first threshold, the control plane network element determines that the first request needs to be sent to the user plane network element, where the first request is used to request the user plane network element to perform the function for data buffering.

It should be noted that if the current load of the control plane network element is less than a percentage of remaining available resources in all available resources, the control plane network element determines that the current load of the control plane network element reaches or exceeds the first threshold. In practical application, it may be further set that if the current load of the control plane network element is greater than a percentage of used resources in all available resources, or the current load of the control plane network element is less than a percentage of remaining available resources in all available resources, the control plane network element determines that the current load of the control plane network element reaches or exceeds the first threshold. Therefore, a manner in which the control plane network element determines that the current load of the control plane network element reaches or exceeds the first threshold is not limited herein.

It may be understood that if the control plane network element determines that the current load of the control plane network element is less than the first threshold, the control plane network element does not need to send the first request to the user plane network element.

307. The control plane network element determines that the user plane network element supports a first function.

After the control plane network element obtains the first function list, because the first function list includes all the functions supported by the user plane network element, the control plane network element finds a function that is also supported by the control plane network element from the first function list, to determine all the functions supported by both the control plane network element and the user plane network element. In practical application, all the functions supported by both the control plane network element and the user plane network element include a data buffering function, a user plane tunnel address allocation function, a packet redirection function, a packet buffering function, or the like. The control plane network element finds the first function from all the functions supported by both the control plane network element and the user plane network element, to determine that the user plane network element supports the first function. The first function includes at least one of all the functions supported by both the control plane network element and the user plane network element.

308. The user plane network element receives a load request sent by the control plane network element.

The control plane network element determines that the first request needs to be sent to the user plane network element, to transfer the function for data buffering. The user plane network element receives the load request sent by the control plane network element, to send dynamic load status information of the user plane network element to the control plane network element, so that the control plane network element determines that the user plane network element currently has a capability of performing the first function.

It should be noted that in practical application, the user plane network element is triggered, in a plurality of manners in addition to receiving the load request sent by the control plane network element, to report the dynamic load status information of the user plane network element to the control plane network element. For example, the user plane network element receives a first interval instruction sent by the control plane network element or the operator device. The first interval instruction instructs the user plane network element to report the dynamic load status information of the user plane network element to the control plane network element at a preset interval, so that the user plane network element periodically reports the dynamic load status information of the user plane network element to the control plane network element. Therefore, a manner in which the user plane network element is triggered to report the dynamic load status information of the user plane network element to the control plane network element is not specifically limited herein.

309. The user plane network element sends dynamic load status information of the user plane network element to the control plane network element.

After the user plane network element receives the load request sent by the control plane network element, the user plane network element sends the dynamic load status information of the user plane network element, namely, current load status information of the user plane network element, to the control plane network element, so that the control plane network element determines that the user plane network element currently has the capability of performing the first function.

It should be noted that in practical application, the user plane network element may passively send the dynamic load status information of the user plane network element to the control plane network element after receiving the load request sent by the control plane network element; or the user plane network element may proactively periodically report the dynamic load status information of the user plane network element to the control plane network element after receiving the first interval instruction sent by the control plane network element or the operator device. Therefore, a manner in which the user plane network element sends the dynamic load status information of the user plane network element to the control plane network element is not specifically limited herein.

310. The control plane network element obtains a resource occupied by the first function and an available resource of the user plane network element.

After the control plane network element determines that the user plane network element supports the first function, because the first function includes the function for data buffering and the function occupies a very large system resource when being performed, before determining to transfer the first function to the user plane network element, the control plane network element determines whether current load of the user plane network element supports performing of the first function.

After receiving the dynamic load status information of the user plane network element that is sent by the user plane network element, the control plane network element determines the available resource of the user plane network element from the dynamic load status information of the user plane network element, and the control plane network element determines the resource occupied by the first function, to determine, based on the available resource of the user plane network element and the resource occupied by the first function, that the user plane network element currently has the capability of performing the first function.

311. The control plane network element determines that the user plane network element currently has a capability of performing the first function.

After obtaining the resource occupied by the first function and the available resource of the user plane network element, the control plane network element compares the resource occupied by the first function with the available resource of the user plane network element. If the available resource of the user plane network element is larger than the resource occupied by the first function, the control plane network element determines that the user plane network element currently has the capability of performing the first function.

It may be understood that if the available resource of the user plane network element is not larger than the resource occupied by the first function, the control plane network element determines that the user plane network element currently does not have the capability of performing the first function.

It should be noted that in practical application, the control plane network element may determine, in a plurality of manners, that the user plane network element currently has the capability of performing the first function, in addition to determining, based on the resource occupied by the first function and the available resource of the user plane network element, that the user plane network element currently has the capability of performing the first function. For example, the control plane network element determines a used resource of the user plane network element from the dynamic load status information of the user plane network element, and adds the used resource and the resource occupied by the first function, to obtain a third value. If the third value is less than a preset threshold, the control plane network element determines that the user plane network element currently has the capability of performing the first function. The preset threshold indicates that if the used resource exceeds the preset threshold, a system operates in an overloaded state. Therefore, a manner in which the control plane network element determines that the user plane network element currently has the capability of performing the first function is not specifically limited herein.

In addition, there are some cases in practical application, for example, the control plane network element needs to transfer a plurality of first functions for data buffering, but after obtaining the resource occupied by the first function and the available resource of the user plane network element, the control plane network element determines that the user plane network element supports only some of the plurality of functions for data buffering. Therefore, when ensuring that the user plane network element does not operate in an overloaded state after the user plane network element performs the first function, the control plane network element randomly selects some functions for data buffering as first functions to be performed by the user plane network element, or selects, as first functions to be performed by the user plane network element, some functions for data buffering from the plurality of functions according to a preset selection rule. The preset selection rule includes a terminal identifier priority, a service identifier priority, or the like. This is not specifically limited herein.

312. The control plane network element determines a priority of first identification information based on a correspondence between identification information and a priority level.

In practical application, to ensure that an important user can continuously and stably use a function by using the terminal, or the user is not affected when executing an urgent service, user identifiers, service identifiers, or the like, corresponding to functions are classified based on priorities, to provide a better service. When load is very high, a running speed of a system becomes low or the system is shut down. Therefore, when load of the control plane network element is very high, and the control plane network element needs to transfer a function consuming relatively high load, for example, the function for data buffering, the control plane network element more preferentially ensures stability of the function if the function corresponds to a higher priority.

After determining that the user plane network element supports the first function, the control plane network element obtains the first identification information corresponding to the first function, where the first identification information is carried in the first request, to notify the user plane network element of the first identification information of the first function. Then the control plane network element finds the priority of the first identification information from the locally stored correspondence between identification information and a priority level, to determine whether the first function is to be performed by the user plane network element or the control plane network element.

It should be noted that in practical application, the first identification information includes a user identifier, a tunnel identifier, a service identifier, or the like, and may be specifically an international mobile subscriber identity (IMSI), an access point name (APN), a UE type, or the like. This is not specifically limited herein.

It may be understood that the correspondence between identification information and a priority level may be stored in a local database in a form of a column or a document, or a K-V form, or may be directly represented in the identification information in practical application. For example, a user identifier corresponding to the packet redirection function carries a priority identification number 1, and the control plane network element determines, according to an agreed rule, that a user identifier carrying the priority identification number 1 corresponds to a high priority user. In other words, a priority of the user identifier of the packet redirection function is determined. Therefore, a representation manner of the correspondence between identification information and a priority level is not specifically limited herein.

The priority of the identification information corresponding to the first function is determined from the preset correspondence between identification information and a priority level, and the identification information includes a terminal identifier, a service identifier, a user plane channel identifier, or the like. This is not specifically limited herein.

313. The control plane network element determines, based on the priority of the first identification information and a preset priority execution mode, that the first function is to be performed by the user plane network element.

After the control plane network element determines the priority of the first identification information, because the preset priority execution mode includes identification information, an identification information priority, and an execution mode, the control plane network element may find an execution mode corresponding to the first function, and determine that the first function is to be performed by the user plane network element.

It may be understood that in practical application, during priority execution mode configuration, when load of a CP system is very high, and a priority of identification information is greater than a specified level, only the control plane network element can perform a corresponding function, or when load of a CP system is very high, and a priority of identification information is greater than a specified level, a corresponding function is preferentially transferred to the user plane network element for performing. Therefore, the preset priority execution mode is not specifically limited herein.

It should be noted that the priority execution mode may be stored in the local database in a form of a column or a document, or may be directly obtained based on a priority in practical application. For example, when the control plane network element determines that a priority of a user identifier corresponding to the buffering function is a high priority, and the control plane network element determines, by default according to a rule preset by the operator device, that the control plane network element performs a function used by a high priority user, the buffering function is still performed by the control plane network element. Therefore, a representation manner of the priority execution mode is not specifically limited herein.

314. The control plane network element sends the first request to the user plane network element.

After determining that the first function is to be performed by the user plane network element, the control plane network element sends the first request to the user plane network element, to instruct the user plane network element to perform the first function.

It may be understood that the first request is used to request the user plane network element to perform the first function. In other words, the user plane network element may learn of, by using the first request, a function included in the first function. The control plane network element may add, to the first request, a name of the first function, for example, a packet redirection function, a user plane tunnel address allocation function, or a DHCP function, or add an identification code of the first function to the first request, for example, A represents the packet redirection function, and B represents the user plane tunnel address allocation function. Therefore, the user plane network element may determine the first function by using the identification code in the first request, and the identification code is agreed on by both the user plane network element and the control plane network element. Therefore, a representation manner of the first function is not specifically limited herein.

315. The user plane network element determines a size of the resource occupied by the first function.

After the user plane network element receives the first request sent by the control plane network element, because the first request includes the function for data buffering, and a time at which the user plane network element sends the dynamic load status information of the user plane network element to the control plane network element is inconsistent with a time at which the UP receives the first request sent by the control plane network element, the dynamic load status information of the user plane network element may also change. Therefore, the user plane network element needs to determine, based on the dynamic load status information of the user plane network element and the size of the resource occupied by the first function, that the user plane network element currently has the capability of performing the first function. After the user plane network element receives the first request, because the first request carries information about the first function, the user plane network element may obtain the size of the resource occupied by the first function.

It should be noted that in addition to obtaining, by the user plane network element by using the first request, the size of the resource occupied by the first function, in practical application, the control plane network element can send, in a form of information, the size of the resource occupied by the first function to the user plane network element. Therefore, a manner in which the user plane network element obtains the size of the resource occupied by the first function is not specifically limited herein.

316. The user plane network element adds a size of a currently used resource of the user plane network element and the size of the resource occupied by the first function.

The user plane network element obtains the dynamic load status information of the user plane network element, and obtains the size of the currently used resource of the user plane network element. Then the user plane network element adds the size of the resource occupied by the first function and the size of the used resource, to obtain a first value, so as to determine that the user plane network element currently has the capability of performing the first function.

317. The user plane network element determines that load does not exceed a second threshold after the first function is enabled.

After adding the size of the resource occupied by the first function and the size of the used resource, to obtain the first value, the user plane network element compares the first value with a preset size of a used resource. When a dynamic size of a used resource of the user plane network element exceeds the preset size of a used resource, load of the user plane network element is very high. Therefore, if the first value is less than the preset size of a used resource, the user plane network element determines that the load does not exceed the second threshold after the first function is enabled.

It may be understood that if the first value is not less than the preset size of a used resource, the user plane network element determines that the load exceeds the second threshold after the first function is enabled. Therefore, the user plane network element refuses to perform the function for data buffering in the first function, and the function for data buffering is still performed by the control plane network element.

It should be noted that in step 315 to step 317, the user plane network element determines that the load of the user plane network element does not exceed the second threshold after the user plane network element enables the first function. In practical application, the user plane network element may determine this in a plurality of manners. For example, the user plane network element determines the size of the resource occupied by the first function, and obtains a size of a currently remaining resource of the user plane network element based on the dynamic load status information of the user plane network element, and the user plane network element subtracts the size of the resource occupied by the first function from the size of the remaining resource, to obtain a second value, and compares the second value with a preset size of a remaining resource. When a dynamic size of a remaining resource of the user plane network element is not greater than the preset size of a remaining resource, the load of the user plane network element is very high. Therefore, if the second value is less than the preset size of a remaining resource, the user plane network element determines that the load does not exceed the second threshold after the first function is enabled. Therefore, a manner in which the user plane network element determines that the load of the user plane network element does not exceed the second threshold after the first function is enabled is not specifically limited herein.

318. The user plane network element enables the first function.

The first function includes the function for data buffering and the function for address allocation, and therefore, after receiving the first request, the user plane network element enables the function for address allocation in the first function. In addition, after determining that the load of the user plane network element does not exceed the second threshold after the first function is enabled, the user plane network element enables the function for data buffering in the first function.

319. The user plane network element sends a first response to the control plane network element.

After enabling the first function, the user plane network element sends the first response to the control plane network element, to notify the control plane network element that the first function is enabled, so that the control plane network element disables the first function.

320. The control plane network element disables the first function.

After receiving the first response sent by the user plane network element, the control plane network element determines that the first function is transferred to the user plane network element for performing. Therefore, the control plane network element disables the first function.

321. The user plane network element updates locally stored information about an allocable address based on the first function.

After the user plane network element enables the first function, when the user plane network element performs the function for address allocation, because the locally stored information about an allocable address is limited, after allocating an address, the user plane network element updates the locally stored information about an allocable address, to prevent an address from being allocated again.

It should be noted that in practical application, in addition to locally obtaining the address information, the user plane network element obtains the address information in a plurality of manners, including: the user plane network element receives, after sending an address allocation instruction to the operator device, an allocable address sent by the operator device. Therefore, a manner in which the user plane network element obtains the address information is not specifically limited herein.

In this embodiment of the present disclosure, functions that the control plane network element needs to transfer to the user plane network element include the function for address allocation and the function for data buffering. After determining that the user plane network element can support the function for address allocation, the control plane network element can transfer the function for address allocation to the UP. When the control plane network element determines that the current load of the control plane network element exceeds the first threshold, and the user plane network element currently has a capability of supporting the function for data buffering, the control plane network element sends the request to the user plane network element. In addition, after the user plane network element determines that the load of the user plane network element does not exceed the second threshold after the first function is performed, the user plane network element enables the first function. In this embodiment of the present disclosure, because the user plane network element supports the first function, the control plane network element transfers the first function to the user plane network element for performing, so that network resources can be dynamically adjusted, and different first functions can be more flexibly performed.

FIG. 3A and FIG. 3B show Case 1 in which the first function includes the function for address allocation and the function for data buffering, and FIG. 4A, FIG. 4B, FIG. 5A, and FIG. 5B describe Case 2 in which the first function includes only the function for data buffering.

Referring to FIG. 4A and FIG. 4B, another embodiment of a function scheduling method in the embodiments of the present disclosure includes the following steps.

401. A control plane network element receives a first function list from a user plane network element.

402. The control plane network element obtains current load of the control plane network element.

403. The control plane network element determines that a first request needs to be sent to the user plane network element.

404. The control plane network element determines that the user plane network element supports a first function.

405. The user plane network element receives a load request sent by the control plane network element.

406. The user plane network element sends dynamic load status information of the user plane network element to the control plane network element.

407. The control plane network element obtains a resource occupied by the first function and an available resource of the user plane network element.

408. The control plane network element determines that the user plane network element currently has a capability of performing the first function.

In this embodiment, step 403 to step 408 are similar to step 306 to step 311 in FIG. 3A, and details are not described herein again.

409. The control plane network element sends the first request to the user plane network element.

410. The user plane network element determines a size of the resource occupied by the first function.

411. The user plane network element adds a size of a currently used resource of the user plane network element and the size of the resource occupied by the first function, to obtain a first value.

412. The user plane network element determines that load does not exceed a second threshold after the first function is enabled.

413. The user plane network element enables the first function.

The first function includes only a function for data buffering, and therefore, after determining that the load of the user plane network element does not exceed the second threshold, the user plane network element enables the function for data buffering in the first function.

414. The user plane network element sends a first response to the control plane network element.

415. The control plane network element disables the first function.

In this embodiment, step 401, step 402, step 409 to step 412, and step 414 and step 415 are respectively similar to step 301, step 302, step 314 to step 317, and step 319 and step 320 in FIG. 3A and FIG. 3B. For a specific implementation process, refer to the detailed descriptions in FIG. 3A and FIG. 3B. Details are not described herein again.

In this embodiment of the present disclosure, when the first function includes only the function for data buffering, and the control plane network element determines that the current load of the control plane network element exceeds a first threshold, and the user plane network element currently has a capability of supporting the function, the control plane network element sends the request to the user plane network element. After the user plane network element determines that the load of the user plane network element does not exceed the second threshold after the first function is performed, the user plane network element enables the first function. Therefore, pressure of the control plane network element is relieved, and it is ensured that the control plane network element can operate continuously and normally.

It should be noted that when the first function includes only the function for data buffering, the control plane network element may further determine, based on a priority of identification information, that the user plane network element has the capability of performing the first function. Referring to FIG. 5A and FIG. 5B, another embodiment of a function scheduling method in the embodiments of the present disclosure includes the following steps.

501. A control plane network element receives a first function list from a user plane network element.

502. The control plane network element obtains current load of the control plane network element.

503. The control plane network element determines that a first request needs to be sent to the user plane network element.

504. The control plane network element determines that the user plane network element supports a first function.

505. The user plane network element receives a load request sent by the control plane network element.

506. The user plane network element sends dynamic load status information of the user plane network element to the control plane network element.

507. The control plane network element obtains a resource occupied by the first function and an available resource of the user plane network element.

508. The control plane network element determines that the user plane network element currently has a capability of performing the first function.

In this embodiment, step 501 to step 508 are similar to step 401 to step 408 in FIG. 4A, and details are not described herein again.

509. The control plane network element determines a priority of first identification information based on a correspondence between identification information and a priority level.

510. The control plane network element determines, based on the priority of the first identification information and a preset priority execution mode, that the first function is to be performed by the user plane network element.

511. The control plane network element sends the first request to the user plane network element.

512. The user plane network element determines a size of the resource occupied by the first function.

513. The user plane network element adds a size of a currently used resource of the user plane network element and the size of the resource occupied by the first function, to obtain a first value.

514. The user plane network element determines that load does not exceed a second threshold after the first function is enabled.

515. The user plane network element enables the first function.

516. The user plane network element sends a first response to the control plane network element.

517. The control plane network element disables the first function.

In this embodiment, step 509 and step 510 are similar to step 312 and step 313 in FIG. 3B, and step 511 to step 517 are similar to step 409 to step 415 in FIG. 4B. For a specific implementation process, refer to the detailed descriptions in FIG. 3B and FIG. 4B, and details are not described herein again.

In this embodiment of the present disclosure, after determining that the user plane network element currently has the capability of performing the first function, the control plane network element determines, based on the priority of the identification information corresponding to the first function, that the first function is to be performed by the user plane network element. This refines processing of a function for data buffering that is supported by both the control plane network element and the user plane network element, makes this embodiment of the present disclosure more pertinent in practical application, and increases implementations of this embodiment of the present disclosure.

FIG. 3A and FIG. 3B show a case in which the first function includes the function for address allocation and the function for data buffering, FIG. 4A, FIG. 4B, FIG. 5A, and FIG. 5B show a case in which the first function includes only the function for data buffering, and FIG. 6 describes a case in which the first function includes only the function for address allocation.

Referring to FIG. 6, another embodiment of a function scheduling method in the embodiments of the present disclosure includes the following steps.

601. A control plane network element receives a first function list from a user plane network element.

602. The control plane network element receives location information of a terminal from the terminal.

603. The control plane network element receives location information of the user plane network element from the user plane network element.

604. The control plane network element compares a first distance with a second distance based on the location information.

605. The control plane network element determines that a first request needs to be sent to the user plane network element.

606. The control plane network element determines that the user plane network element supports a first function.

607. The control plane network element sends the first request to the user plane network element.

608. The user plane network element enables the first function.

Because the first function includes only a function for address allocation, after receiving the first request, the user plane network element enables the function for address allocation in the first function.

609. The user plane network element sends a first response to the control plane network element.

610. The control plane network element disables the first function.

611. The user plane network element updates locally stored information about an allocable address based on the first function.

In this embodiment, step 601, step 602 to step 606, step 607, and step 609 to step 611 are respectively similar to step 301, step 303 to step 307, step 314, and step 319 to step 321 in FIG. 3A and FIG. 3B. For a specific implementation process, refer to the detailed descriptions in FIG. 3A and FIG. 3B. Details are not described herein again.

In this embodiment of the present disclosure, when the first function includes only the function for address allocation, after determining that the user plane network element can support the function, the control plane network element may request to transfer the function to the user plane network element. Then the user plane network element enables the first function, and after enabling the first function, the user plane network element updates the locally stored current information about an allocable address, so that a system can perform a corresponding function in a more optimized path, and processing efficiency of the system is also improved.

The embodiments of the present disclosure further provide another function scheduling method, and a user plane network element, a control plane network element, and a system that are based on the method. The method includes: sending, by a user plane network element, a second request to a control plane network element, where the second request is used to request the control plane network element to perform a second function, and the second function is a function supported by both the user plane network element and the control plane network element; enabling, by the control plane network element, the second function; and disabling, by the user plane network element, the second function. In the solution of this embodiment of the present disclosure, the user plane network element may transfer the second function, namely, the function supported by both the control plane network element and the user plane network element, to the control plane network element for performing, so that network resources can be dynamically adjusted, and the function supported by both the control plane network element and the user plane network element can be more flexibly processed. For example, the function scheduling method may be shown in FIG. 7.

In this embodiment of the present disclosure, the second function may include a function for data buffering, and the user plane network element may determine, based on current load of the user plane network element, to send the second request to the control plane network element, to request the control plane network element to perform the second function. It may be understood that the user plane network element is performing the second function before performing the solution of this embodiment of the present disclosure. In practical application, the second function may also be referred to as a shared function or a common function. This is not limited in this embodiment of the present disclosure.

Figure 7:
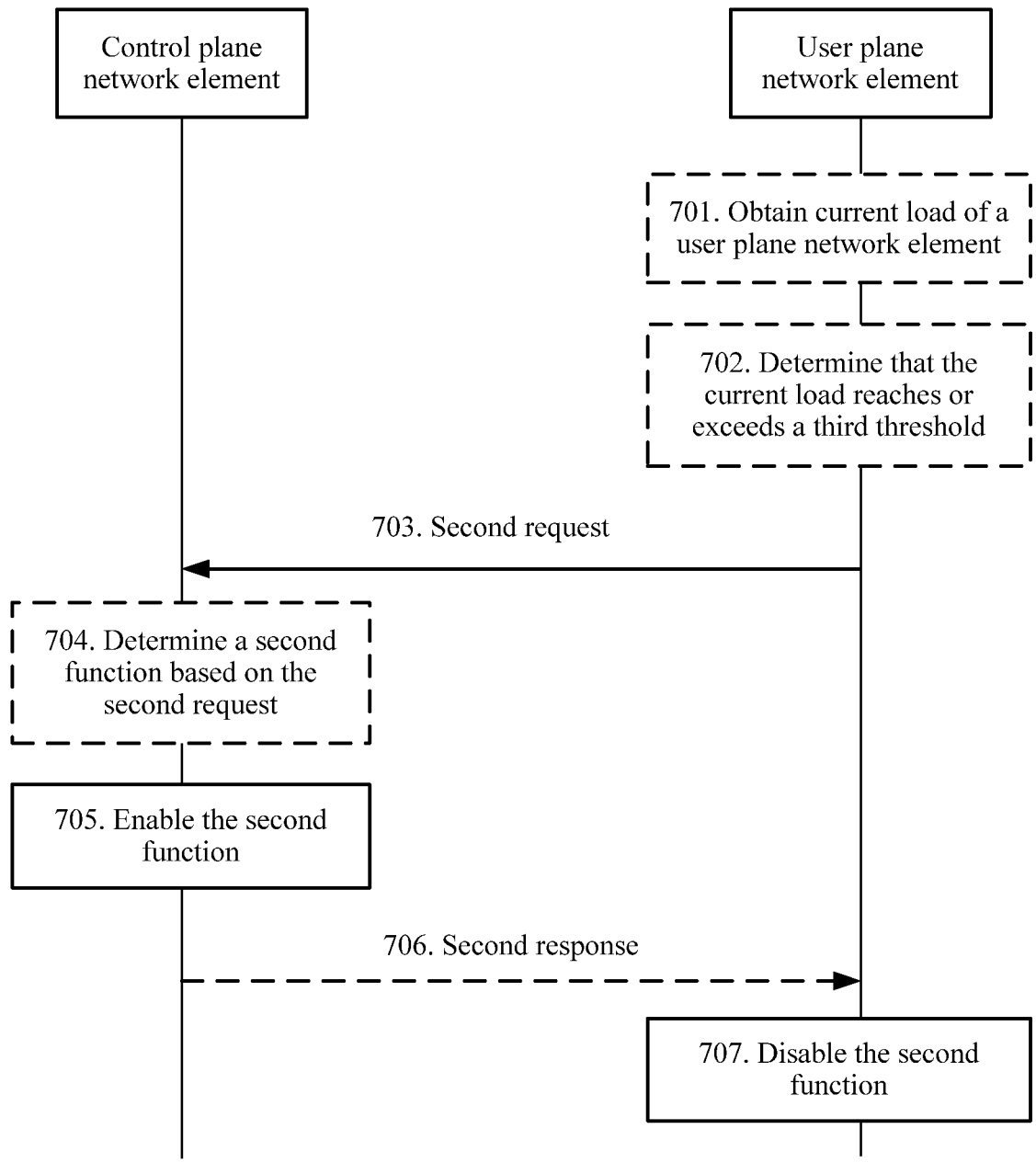
FIG. 7 is a schematic communication diagram of yet another possible function scheduling method according to an embodiment of the present disclosure.

Referring to FIG. 7, another embodiment of a function scheduling method in the embodiments of the present disclosure includes step 701 to step 707, and step 701, step 702, step 704, and step 706 are optional steps.

701. A user plane network element obtains current load of the user plane network element.

When load is very high, a running speed of a system becomes low or even the system is shut down. A function supported by both a control plane network element and the user plane network element includes a function for data buffering, and a relatively large quantity of available system resources are occupied when the function for data buffering is performed. Therefore, to ensure that a system can operate continuously and normally and the system resources can be properly used, the user plane network element obtains the current load of the user plane network element to determine that a second request needs to be sent to the control plane network element, to request to transfer the function for data buffering to the control plane network element for performing.

702. The user plane network element determines that the current load reaches or exceeds a third threshold.

After the user plane network element obtains the current load of the user plane network element, the user plane network element determines that the current load exceeds the third threshold. It should be noted that if the current load of the user plane network element is less than a percentage of remaining available resources in all available resources, the user plane network element determines that the current load of the user plane network element reaches or exceeds the third threshold. In practical application, it may be further set that if the current load of the user plane network element is greater than a percentage of used resources in all available resources, or the current load of the user plane network element is less than a percentage of remaining available resources in all available resources, the user plane network element determines that the current load of the user plane network element exceeds the third threshold. Therefore, a manner in which the user plane network element determines that the current load of the user plane network element reaches or exceeds the third threshold is not limited herein.

It may be understood that if the user plane network element determines that the current load of the user plane network element does not reach the third threshold, the user plane network element may not transfer the function to the control plane network element.

703. The user plane network element sends a second request to a control plane network element.

After the user plane network element determines that the current load of the user plane network element reaches or exceeds the third threshold, the user plane network element sends the second request to the control plane network element. The second request is used to request the control plane network element to perform the second function, and the second function is a function that is being performed by the user plane network element and that is also supported by the control plane network element.

It should be noted that the second function includes a data buffering function, a packet buffering function, a deep packet parsing function, or the like. This is not specifically limited herein.

It may be understood that the second request is used to request the control plane network element to perform the second function. In other words, the control plane network element may learn of, by using the second request, a function included in the second function. The user plane network element may add, to the second request, a name of the second function, for example, a packet redirection function, a user plane tunnel address allocation function, or a DHCP function, or add an identification code of the second function to the second request, for example, A represents the packet redirection function, and B represents the user plane tunnel address allocation function. Therefore, the control plane network element may determine the second function by using the identification code in the second request, and the identification code is agreed on by both the user plane network element and the control plane network element. Therefore, a representation manner of the second function is not specifically limited herein.

704. The control plane network element determines a second function based on the second request.

After the control plane network element receives the second request sent by the user plane network element, because the second request carries information about the second function, the control plane network element may determine the second function.

It should be noted that in practical application, there are a plurality of manners in which the control plane network element determines the second function. In addition to determining the second function based on the second request, when the second request carries dynamic load status information of the user plane network element, the control plane network element may determine, based on the dynamic load status information, all functions currently performed by the user plane network element, and determines, from all the functions currently performed by the user plane network element, the second function that can also be supported by the control plane network element. Functions supported by both the control plane network element and the user plane network element include a function for address allocation and the function for data buffering, a relatively small quantity of resources are consumed when the function for address allocation is performed, and a relatively large quantity of resources are consumed when the function for data buffering is performed. Therefore, when the current load of the user plane network element reaches or exceeds the third threshold, the function for data buffering that consumes a relatively large quantity of resources needs to be transferred to the control plane network element for performing. Therefore, when the load of the user plane network element is very high, a function that the control plane network element is requested to perform is the function for data buffering.

It may be understood that the user plane network element may also obtain location information of the control plane network element and location information of a terminal. If a distance between the user plane network element and the terminal is greater than a distance between the control plane network element and the terminal, the user plane network element may also request the control plane network element to perform the function for address allocation. Therefore, a specific type of the second function is not limited herein.

705. The control plane network element enables the second function.

After the control plane network element determines the second function based on the second request, the control plane network element starts performing the second function, so that the user plane network element can disable the second function.

706. The control plane network element sends a second response to the user plane network element.

After enabling the second function, the control plane network element sends the second response to the user plane network element, to notify the user plane network element that the second function is enabled, so that the user plane network element disables the second function.

707. The user plane network element disables the second function.

After receiving the second response sent by the control plane network element, the user plane network element determines that the second function is transferred to the control plane network element for performing. Therefore, the user plane network element disables the second function.

In this embodiment of the present disclosure, after the UP determines that the current load of the UP exceeds the third threshold, the user plane network element sends the second request to the control plane network element. The second request is used to request the control plane network element to perform the second function, and the second function is a function supported by both the control plane network element and the user plane network element. Therefore, the user plane network element disables the second function. In this embodiment of the present disclosure, because the control plane network element supports the second function, the user plane network element transfers the second function to the control plane network element for performing. This relieves pressure of the user plane network element, and dynamically adjusts network resources.

The foregoing mainly describes the solutions provided in the embodiments of the present disclosure from a perspective of interaction between network elements. It may be understood that, to implement the foregoing functions, each network element, such as the user plane network element or the control plane network element, includes a corresponding hardware structure and/or software module for performing each function. A person of ordinary skill in the art should easily be aware that, in the present disclosure, units and algorithm steps in examples described with reference to the embodiments disclosed in this specification may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the embodiments of the present disclosure, functional units may be obtained by dividing the control plane network element or the user plane network element based on the foregoing method example. For example, each functional unit may be obtained through division based on each function, or two or more functions may be integrated into one processing unit. The integrated unit may be implemented in a form of hardware, or may be implemented in a form of a software functional unit. It should be noted that in the embodiments of the present disclosure, unit division is an example, is merely logical function division, and may be other division in actual implementation.

Figure 8A:
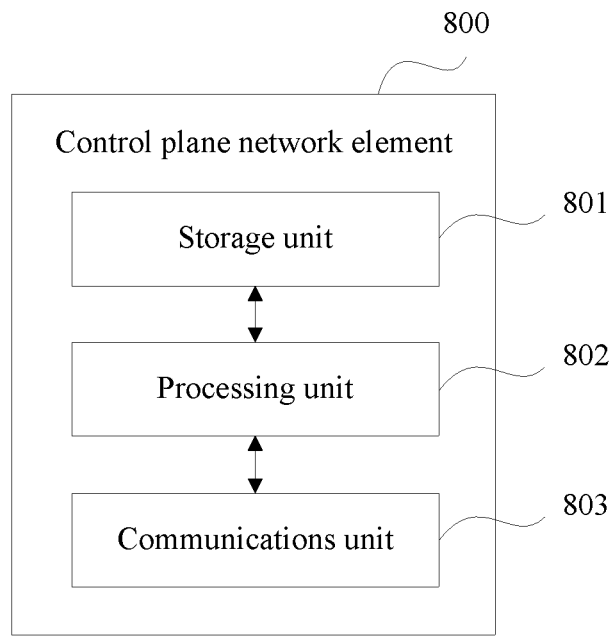
FIG. 8A is a schematic block diagram of a control plane network element according to an embodiment of the present disclosure.

When the integrated unit is used, FIG. 8A is a possible schematic structural diagram of a control plane network element in the foregoing embodiment. A control plane network element 800 includes a processing unit 802 and a communications unit 803. The processing unit 802 is configured to control and manage actions of the control plane network element. For example, the processing unit 802 is configured to support the control plane network element in performing step 201 and step 203 in FIG. 2, step 302, step 305 to step 308, step 310 to step 314, and step 320 in FIG. 3A and FIG. 3B, step 402 to step 405, step 407 to step 409, and step 415 in FIG. 4A and FIG. 4B, step 502 to step 505, step 507 to step 511, and step 517 in FIG. 5A and FIG. 5B, step 604 to step 607, and step 610 in FIG. 6, step 704 to step 706 in FIG. 7, and/or another process of the technology described in this specification. The communications unit 803 is configured to support communication between the control plane network element and a user plane network element, a terminal, or another network entity. The control plane network element may further include a storage unit 801, configured to store program code and data of the control plane network element.

The processing unit 802 may be a processor or a controller, for example, a central processing unit (CPU), a general-purpose processor, a digital signal processor (DSP), an application-specific integrated circuit (ASIC), a field programmable gate array (FPGA), another programmable logic device, a transistor logic device, a hardware component, or any combination thereof. The processing unit 802 may implement or execute various example logical blocks, modules, and circuits described with reference to content disclosed in the present disclosure. Alternatively, the processor may be a combination implementing a computing function, for example, a combination of one or more microprocessors, or a combination of a DSP and a microprocessor. The communications unit 803 may be a communications interface, a transceiver, a transceiver circuit, or the like. The communications interface is a general name and may include one or more interfaces, for example, a transceiver interface. The storage unit 801 may be a memory.

Figure 8B:
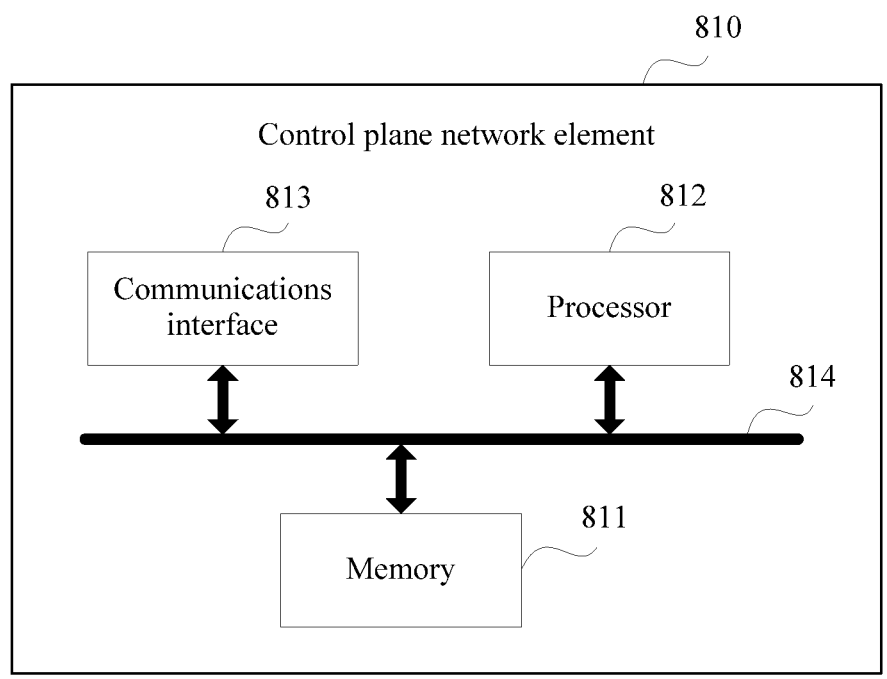
FIG. 8B is a schematic structural diagram of a control plane network element according to an embodiment of the present disclosure.

When the processing unit 802 is a processor, the communications unit 803 is a communications interface, and the storage unit 801 is a memory, the control plane network element in this embodiment of the present disclosure may be a control plane network element shown in FIG. 8B.

Referring to FIG. 8B, the control plane network element 810 includes a processor 812, a communications interface 813, and a memory 811. Optionally, the control plane network element 810 may further include a bus 814. The communications interface 813, the processor 812, and the memory 811 may be connected to each other by using the bus 814. The bus 814 may be a peripheral component interconnect (PCI) bus, an extended industry standard architecture (EISA) bus, or the like. The bus 814 may be classified into an address bus, a data bus, a control bus, and the like. For ease of representation, only one thick line is used to represent the bus in FIG. 8B, but this does not mean that there is only one bus or only one type of bus.

The control plane network element shown in FIG. 8A or FIG. 8B may be a session management network element, a mobility management network element, a policy function management network element, a capability exposure network element, or an authentication authorization network element.

Figure 9A:
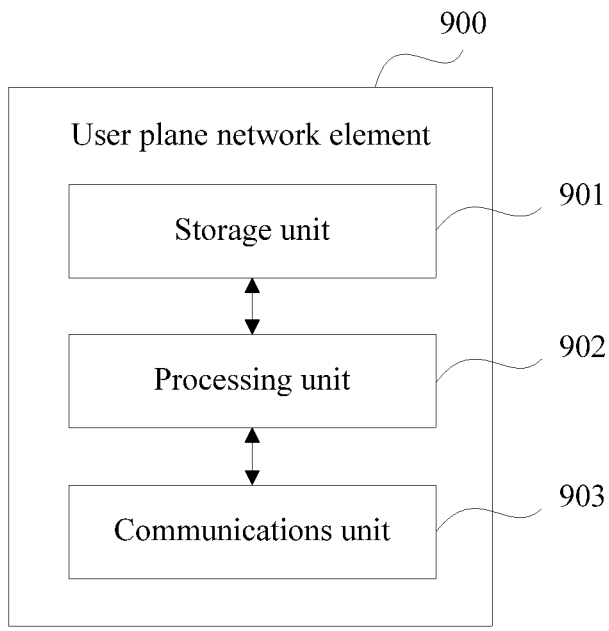
FIG. 9A is a schematic block diagram of a user plane network element according to an embodiment of the present disclosure.

When the integrated unit is used, FIG. 9A is a possible schematic structural diagram of a user plane network element in the foregoing embodiment. A user plane network element 900 includes a processing unit 902 and a communications unit 903. The processing unit 902 is configured to control and manage actions of the user plane network element. For example, the processing unit 902 is configured to support the user plane network element in performing step 202 in FIG. 2, step 301, step 304, step 309, step 315 to step 319, and step 321 in FIG. 3A and FIG. 3B, step 401, step 406, and step 410 to step 414 in FIG. 4A and FIG. 4B, step 501, step 506, and step 512 to step 516 in FIG. 5A and FIG. 5B, step 601, step 603, step 608, step 609, and step 611 in FIG. 6, step 701 to step 703, and step 707 in FIG. 7, and/or another process of the technology described in this specification. The communications unit 903 is configured to support communication between the user plane network element and a control plane network element or another network entity. The user plane network element may further include a storage unit 901, configured to store program code and data of the user plane network element.

The processing unit 902 may be a processor or a controller, for example, a CPU, a general-purpose processor, a DSP, an ASIC, an FPGA, another programmable logic device, a transistor logic device, a hardware component, or any combination thereof. The processing unit 902 may implement or execute various example logical blocks, modules, and circuits described with reference to content disclosed in the present disclosure. Alternatively, the processor may be a combination implementing a computing function, for example, a combination of one or more microprocessors, or a combination of a DSP and a microprocessor. The communications unit 903 may be a communications interface, a transceiver, a transceiver circuit, or the like. The communications interface is a general name and may include one or more interfaces, for example, a transceiver interface. The storage unit 901 may be a memory.

Figure 9B:
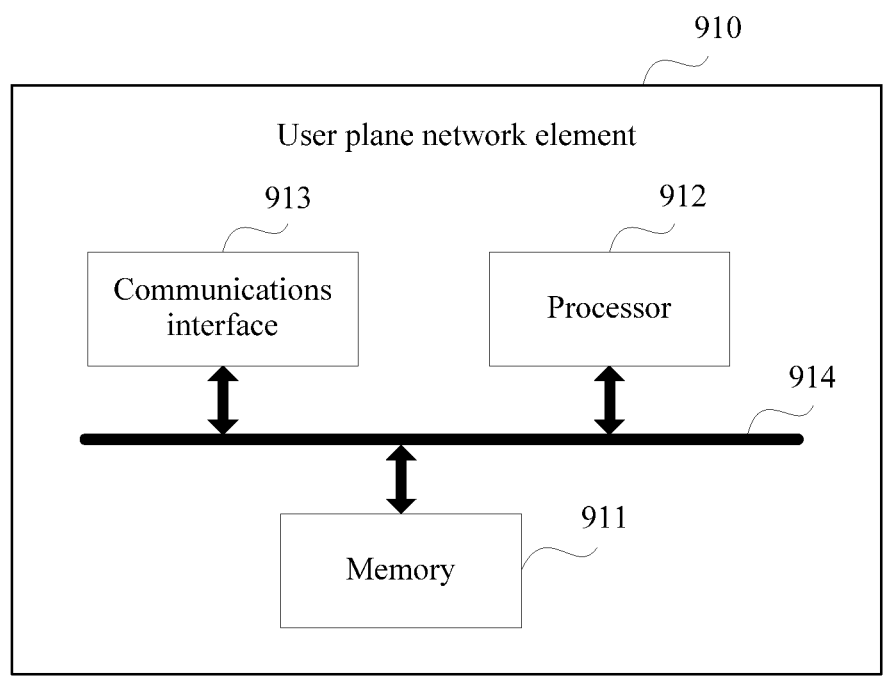
FIG. 9B is a schematic structural diagram of a user plane network element according to an embodiment of the present disclosure.

When the processing unit 902 is a processor, the communications unit 903 is a communications interface, and the storage unit 901 is a memory, the user plane network element in this embodiment of the present disclosure may be a user plane network element shown in FIG. 9B.

Referring to FIG. 9B, the user plane network element 910 includes a processor 912, a communications interface 913, and a memory 911. Optionally, the user plane network element 910 may further include a bus 914. The communications interface 913, the processor 912, and the memory 911 may be connected to each other by using the bus 914. The bus 914 may be a PCI bus, an EISA bus, or the like. The bus 914 may be classified into an address bus, a data bus, a control bus, and the like. For ease of representation, only one thick line is used to represent the bus in FIG. 9B, but this does not mean that there is only one bus or only one type of bus.

The user plane network element shown in FIG. 9A or FIG. 9B may be an access gateway, a mobility gateway, a local gateway, or an anchor gateway.

Methods or algorithm steps described with reference to the content disclosed in the embodiments of the present disclosure may be implemented by hardware, or may be implemented by a processor by executing a software instruction. The software instruction may include a corresponding software module. The software module may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well known in the art. For example, a storage medium is coupled to a processor, so that the processor can read information from the storage medium or write information into the storage medium. Certainly, the storage medium may alternatively be a component of the processor. The processor and the storage medium may be located in an ASIC. In addition, the ASIC may be located in the control plane network element or the user plane network element. Certainly, alternatively, the processor and the storage medium may exist as discrete components in the control plane network element or the user plane network element.

A person skilled in the art should be aware that in the foregoing one or more examples, functions described in the embodiments of the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

In the foregoing specific implementations, the objectives, technical solutions, and beneficial effects of the embodiments of the present disclosure are further described in detail. It should be understood that the foregoing descriptions are merely specific implementations of the embodiments of the present disclosure, but are not intended to limit the protection scope of the embodiments of present disclosure. Any modification, equivalent replacement, or improvement made based on the technical solutions of the embodiments of the present disclosure shall fall within the protection scope of the embodiments of the present disclosure.

What is claimed is:

1. A method comprising:
sending, by a control plane network element configured to perform a first function, a first request to a user plane network element, wherein the first request requests to transfer the first function to the user plane network element for the user plane network element to perform the first function, and the first function is supported by both the control plane network element and the user plane network element; and
disabling, by the control plane network element when the first function is transferred to the user plane network element, the first function at the control plane network element.

2. The method according to claim 1, wherein before sending, by the control plane network element configured to perform the first function, the first request, the method further comprises:

obtaining, by the control plane network element, current load of the control plane network element or location information, wherein the location information comprises first location information of the user plane network element and second location information of a terminal; and determining, by the control plane network element based on the current load of the control plane network element or the location information, that the first request needs to be sent to the user plane network element.

3. The method according to claim 2, wherein determining, by the control plane network element based on the location information, that the first request needs to be sent to the user plane network element comprises:

comparing, by the control plane network element, a first distance with a second distance based on the location information, wherein the first distance is between the control plane network element and the terminal, and the second distance is between the user plane network element and the terminal; and when the first distance is greater than the second distance, determining, by the control plane network element, that the first request needs to be sent to the user plane network element.

4. The method according to claim 2, wherein determining, by the control plane network element based on the current load of the control plane network element, that the first request needs to be sent to the user plane network element comprises:

when the current load of the control plane network element reaches or exceeds a first threshold, determining, by the control plane network element, that the first request needs to be sent to the user plane network element.

5. The method according to claim 2, wherein before determining, by the control plane network element based on the current load of the control plane network element or the location information, that the first request needs to be sent to the user plane network element, the method further comprises:

receiving, by the control plane network element, a first function list from the user plane network element, wherein the first function list comprises functions supported by the user plane network element; or locally querying and obtaining, by the control plane network element, a second function list, wherein the second function list comprises functions supported by the user plane network element or functions supported by both the control plane network element and the user plane network element; and when the first function list or the second function list comprises the first function, determining, by the control plane network element, that the user plane network element supports the first function.

6. The method according to claim 5, wherein after determining, by the control plane network element, that the user plane network element supports the first function, the method further comprises:

obtaining, by the control plane network element, first identification information corresponding to the first function, wherein the first identification information comprises a user identifier, a tunnel identifier, or a service identifier, and the first request carries the first identification information;

determining, by the control plane network element, a priority of the first identification information based on a correspondence between identification information and a priority level; and determining, by the control plane network element based on the priority of the first identifier information and a preset priority execution mode, that the first function is to be performed by the user plane network element.

7. A method, comprising:

receiving, by a user plane network element, a first request sent by a control plane network element, wherein the first request instructs that a first function is transferred from the control plane network element to the user plane network element for the user plane network element to perform the first function, and the first function is a function supported by both the control plane network element and the user plane network element; and enabling, by the user plane network element, the first function at the user plane network element upon receipt of the first request.

8. The method according to claim 7, wherein the first function comprises a function for address allocation, and after enabling, by the user plane network element, the first function, the method further comprises:

updating, by the user plane network element, locally stored information about an allocable address based on the first function; or sending, by the user plane network element, an address allocation instruction to an operator device; and receiving, by the user plane network element, an allocable address sent by the operator device.

9. The method according to claim 7, wherein, after receiving, by the user plane network element, the first request sent by the control plane network element, the method further comprises:

determining, by the user plane network element based on dynamic load status information of the user plane network element and the first function, to enable the first function.

10. The method according to claim 9, wherein determining, by the user plane network element based on the dynamic load status information of the user plane network element and the first function, to enable the first function comprises:

determining, by the user plane network element, a size of a resource occupied by the first function; and when determining, based on the size of the resource occupied by the first function and the dynamic load status information of the user plane network element, that load of the user plane network element does not exceed a second threshold after the first function is enabled, determining, by the user plane network element, to enable the first function.

11. A control plane network element, comprising:

a non-transitory memory, configured to store a computer executable program code; and at least one processor, coupled to the memory, wherein the program code comprises instructions, and when the at least one processor executes the instructions, the instructions enable the control plane network element to perform following operations:

sending a first request to a user plane network element, wherein the first request requests to transfer a first function that is configured to be performed by the control plane network element to the user plane network element for the user plane network element to perform the first function, and the first function is supported by both the control plane network element and the user plane network element; and disabling, upon the first function being transferred to the user plane network element, the first function at the control plane network element.

12. The control plane network element according to claim 11, wherein the operations further comprise:

obtaining current load of the control plane network element or location information, wherein the location information comprises first location information of the user plane network element and second location information of a terminal; and determining, based on the current load of the control plane network element or the location information, that the first request needs to be sent to the user plane network element.

13. The control plane network element according to claim 12, wherein the operation of determining, based on the location information, that the first request needs to be sent to the user plane network element comprises:

comparing a first distance with a second distance based on the location information, wherein the first distance is between the control plane network element and the terminal, and the second distance is between the user plane network element and the terminal; and when the first distance is greater than the second distance, determining that the first request needs to be sent to the user plane network element.

14. The control plane network element according to claim 12, wherein the operation of determining, based on the current load of the control plane network element, that the first request needs to be sent to the user plane network element comprises:

when the current load of the control plane network element reaches or exceeds a first threshold, determining that the first request needs to be sent to the user plane network element.

15. The control plane network element according to claim 12, wherein the operations further comprise:

receiving a first function list from the user plane network element, wherein the first function list comprises functions supported by the user plane network element; or locally querying and obtaining a second function list, wherein the second function list comprises functions supported by the user plane network element or functions supported by both the control plane network element and the user plane network element; and when the first function list or the second function list comprises the first function, determining that the user plane network element supports the first function.

16. The control plane network element according to claim 15, wherein the operations further comprise:

obtaining first identification information corresponding to the first function, wherein the first identification information comprises a user identifier, a tunnel identifier, or a service identifier, and the first request carries the first identification information;

determining a priority of the first identification information based on a correspondence between identification information and a priority level; and determining, based on the priority of the first identifier information and a preset priority execution mode, that the first function is to be performed by the user plane network element.

17. A user plane network element, comprising:

a non-transitory memory, configured to store a computer executable program code; and at least one processor, coupled to the memory, wherein the program code comprises instructions, and when the at least one processor executes the instructions, the instructions enable the user plane network element to perform following operations:

receiving a first request sent by a control plane network element, wherein the first request instructs that a first function is transferred from the control plane network element to the user plane network element for the user plane network element to perform the first function, and the first function is a function supported by both the control plane network element and the user plane network element; and enabling, upon receipt of the first request, the first function at the user plane network element.

18. The user plane network element according to claim 17, wherein the first function comprises a function for address allocation; and the operations further comprise:

updating locally stored information about an allocable address based on the first function; or sending an address allocation instruction to an operator device; and receiving an allocable address sent by the operator device.

19. The user plane network element according to claim 17, wherein the operations further comprise:

determining, based on dynamic load status information of the user plane network element and the first function, to enable the first function.

20. The user plane network element according to claim 19, wherein the operation of determining, based on the dynamic load status information of the user plane network element and the first function, to enable the first function comprises:

determining a size of a resource occupied by the first function; and when determining, based on the size of the resource occupied by the first function and the dynamic load status information of the user plane network element, that load of the user plane network element does not exceed a second threshold after the first function is enabled, determining to enable the first function.

* * * * *